US011869112B2

(12) United States Patent
Zhang et al.

(10) Patent No.: US 11,869,112 B2
(45) Date of Patent: Jan. 9, 2024

(54) WATERMARK EMBEDDING METHOD AND APPARATUS, TERMINAL, AND STORAGE MEDIUM

(71) Applicant: HUAWEI TECHNOLOGIES CO., LTD., Guangdong (CN)

(72) Inventors: Pei Zhang, Beijing (CN); Zhongyong Cheng, Shenzhen (CN); Wenjin Zou, Shanghai (CN); Guangjie Li, Guangzhou (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 559 days.

(21) Appl. No.: 17/138,099

(22) Filed: Dec. 30, 2020

(65) Prior Publication Data
US 2021/0118087 A1  Apr. 22, 2021

Related U.S. Application Data

(63) Continuation of application No. PCT/CN2019/111052, filed on Oct. 14, 2019.

(30) Foreign Application Priority Data
Oct. 15, 2018  (CN) .......................... 201811198415.9

(51) Int. Cl.
G06F 21/00   (2013.01)
H04L 29/06   (2006.01)
(Continued)

(52) U.S. Cl.
CPC ............ *G06T 1/0021* (2013.01); *G06T 17/00* (2013.01)

(58) Field of Classification Search
None
See application file for complete search history.

(56) References Cited

U.S. PATENT DOCUMENTS

2002/0060685 A1*  5/2002  Handley ............... G06T 17/05
                                              345/582
2016/0063661 A1*  3/2016  Doerr ................... G06T 1/0092
                                              382/100
(Continued)

FOREIGN PATENT DOCUMENTS

CN    101251931 A     8/2008
CN    101258522 A  *  9/2008  ........... G06T 1/0028
(Continued)

OTHER PUBLICATIONS

Machine translation of CN-101258522, Picard et al. Oct. 1, 2021.*
Machine Translation of CN-114936960, Zhan et al. Oct. 1, 2021.*
Machine translation of CN-113469868, Zhou et al., Oct. 1, 2021.*
Garcia et al., "Texture Based Watermarking of 3D video objects", IEEE Transactions on Circuits and Systems for Video Technology, vol. 13, No. 8, Aug. 2003. pp. 853-866.*
(Continued)

*Primary Examiner* — Lisa C Lewis
(74) *Attorney, Agent, or Firm* — WOMBLE BOND DICKINSON (US) LLP

(57) ABSTRACT

Embodiments of this application provide a watermark embedding method applicable to a three-dimensional (3D) field. By combining vertex data of an original 3D model and vertex data of a 3D watermark, and combining material data of the original 3D model and material data of the 3D watermark, the original 3D model and the 3D watermark can be synthesized into a 3D model. In addition, before and after watermark embedding, an appearance of the original 3D model can remain unchanged. This avoids impact of watermark embedding on the appearance and use value of the 3D model, and ensures a display effect of the 3D model. Further, a function of encrypting the embedded 3D watermark may be implemented, and the 3D watermark cannot be easily removed or modified. This can effectively ensure the copyright of the original 3D model, and better promote a digital asset such as the 3D model.

30 Claims, 19 Drawing Sheets

(51) Int. Cl.
*G06T 1/00* (2006.01)
*G06T 17/00* (2006.01)

(56) References Cited

U.S. PATENT DOCUMENTS

| 2017/0213310 A1* | 7/2017 | Lee | G06T 1/0021 |
| 2018/0114289 A1* | 4/2018 | Lee | G06F 21/16 |

FOREIGN PATENT DOCUMENTS

| CN | 102999881 A | | 3/2013 |
| CN | 104036448 A | | 9/2014 |
| CN | 104281994 A | | 1/2015 |
| CN | 104318505 A | | 1/2015 |
| CN | 107067361 A | | 8/2017 |
| CN | 108335256 A | | 7/2018 |
| CN | 109544433 A | | 3/2019 |
| CN | 113469868 A | * | 10/2021 |
| CN | 114936960 A | * | 8/2022 |

OTHER PUBLICATIONS

Dugelay et al., "Protection of 3-D object usage through texture watermarking". 2002 11th European Signal Processing Conference, Toulouse, France, 2002, pp. 1-4.*
Jiaqing Lin et al.,"A 3D Authoring Method by Editing Real World Scene",2014 Eighth International Conference on Complex, Intelligent and Software Intensive Systems, Jul. 2-4, 2014 , Birmingham, UK ,toal:7pages.
Xiaoyang Mao et al.,"Watermarking 3D Geometric Models Through Triangle Subdivision",Aug. 2001 ,Proceedings of SPIE—The International Society for Optical Engineering 4314,total:8pages.
Ryutarou Ohbuchi et al.,"Data embedding algorithms for geometrical and non-geometrical targets in three-dimensional polygonal models", Computer Communications, vol. 21, Issue 15, Oct. 1, 1998, total: 11pages.
Liu Quan et al.,"3DWatermarking Algorithms Based onMesh Complanation", Journal of Wut ( Information and Managem Ent Engineering ), vol. 29 No. 12, Dec. 2007, total 4 pages. With an English Abstract.

* cited by examiner

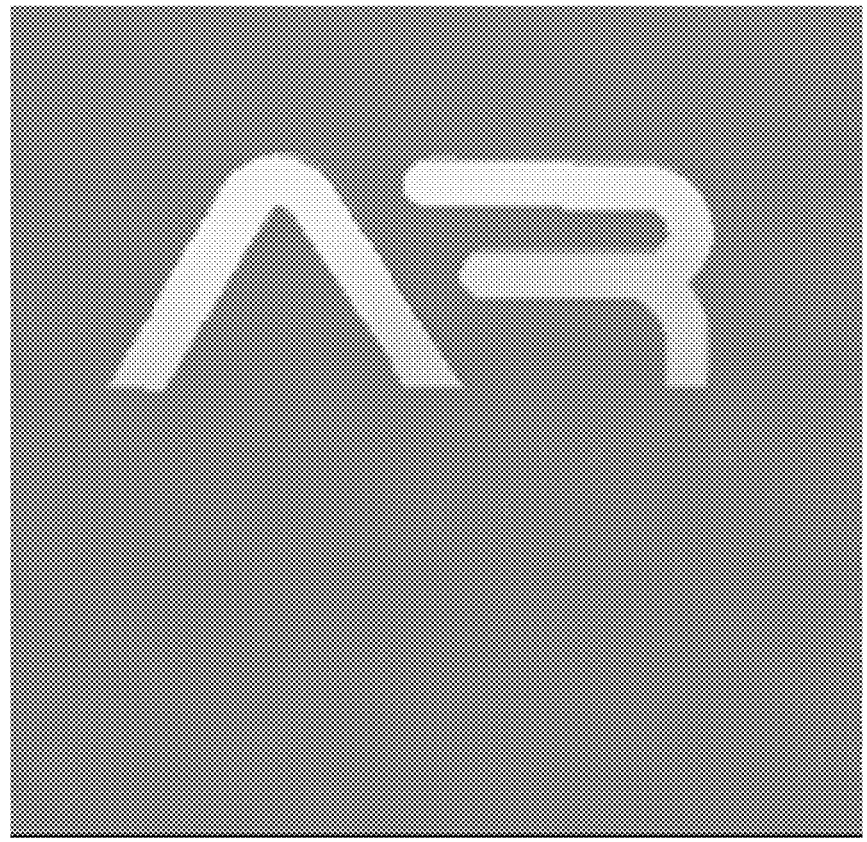
FIG. 4
```
x.mtl————Example of vertex data of an original three-dimensional model
v 2.59562 –10.0518 3.48815————Data of a vertex a1
v 1.94055 –9.51756 3.4141————Data of a vertex b1
v 3.75161 –9.23498 3.01049————Data of a vertex c1
...
f 1 2 3 ————Plane indexes of a triangular surface consisting of the vertices
a1, b1, and c1
```
FIG. 5
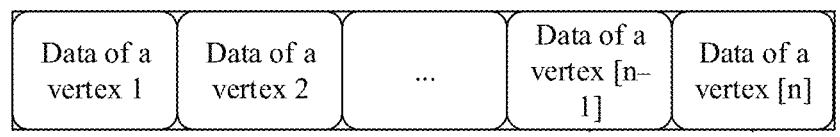
FIG. 6

```
Texture coordinates of an original three-dimensional model:
...
vt  0.488327  0.72009———————Texture coordinates of a vertex a1 on the first plane
vt  0.482076  0.725646——————Texture coordinates of the vertex a1 on the second plane
vt  0.472441  0.716742——————Texture coordinates of the vertex a1 on the third plane
vt  0.480363  0.706376——————Texture coordinates of a vertex b1 on the first plane
vt  0.482076  0.725646——————Texture coordinates of the vertex b1 on the second plane
vt  0.472441  0.716742——————Texture coordinates of the vertex b1 on the third plane
vt  0.480363  0.706376——————Texture coordinates of a vertex c1 on the first plane
vt  0.482076  0.725646——————Texture coordinates of the vertex c1 on the second plane
vt  0.472441  0.716742——————Texture coordinates of the vertex c1 on the third plane
...
```

FIG. 13

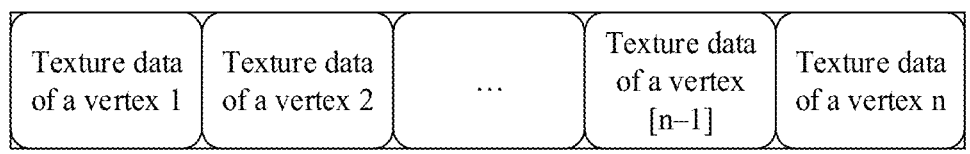

FIG. 14

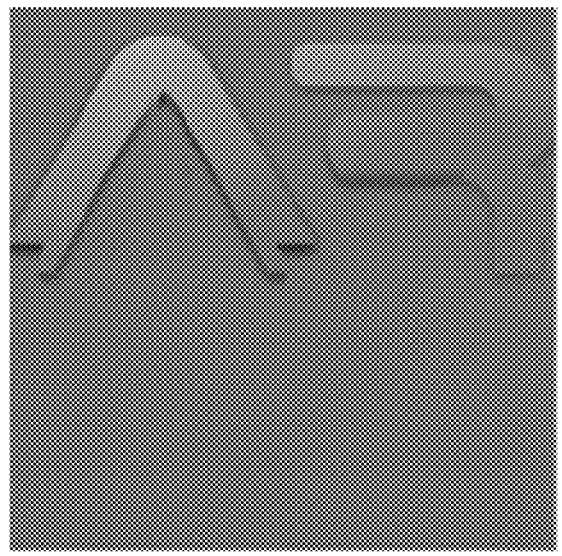

FIG. 15

WATERMARK EMBEDDING METHOD AND APPARATUS, TERMINAL, AND STORAGE MEDIUM

CROSS-REFERENCE TO RELATED APPLICATIONS

This application is a continuation of International Application No. PCT/CN2019/111052, filed on Oct. 14, 2019, which claims priority to Chinese Patent Application No. 201811198415.9, filed on Oct. 15, 2018. The disclosures of the aforementioned applications are hereby incorporated by reference in their entireties.

TECHNICAL FIELD

This application relates to the field of information technologies, and in particular, to a watermark embedding method and apparatus, a terminal, and a storage medium.

BACKGROUND

With the development of information technologies, information such as a producer and a copyright owner may be used as a watermark and embedded into a digital carrier such as an image, a video, and a document based on a specific rule in a manner of watermark embedding, so that the digital carrier carries the watermark. The watermark can be identified and recognized by a user, so as to protect the copyright of the digital carrier without affecting use value of the digital carrier.

When the digital carrier is an image, a patchwork algorithm may be used to embed a two-dimensional watermark into an original two-dimensional image. Specifically, a pixel A and a pixel B are randomly selected from the original two-dimensional image, a luminance value ai of the pixel A is increased by d, and a luminance value bi of the pixel B is decreased by d. Then, the foregoing step is repeatedly for N times. When N is very large, the original two-dimensional image is modified, so that a watermark embedding effect is achieved, where d may be a positive number, and N may be a positive integer.

The foregoing method is only applicable to a two-dimensional image, and currently it is urgently required to provide a solution for embedding a watermark into a three-dimensional model.

SUMMARY

Embodiments of this application provide a watermark embedding method and apparatus, a terminal, and a storage medium. The technical solutions are as follows:

According to a first aspect, a watermark embedding method is provided, and the method includes:
  obtaining an original three-dimensional model and a three-dimensional watermark;
  combining first vertex data of the original three-dimensional model and second vertex data of the three-dimensional watermark to obtain target vertex data, where the target vertex data includes the first vertex data and the second vertex data;
  combining first material data of the original three-dimensional model and second material data of the three-dimensional watermark to obtain target material data, where the target material data includes the first material data and the second material data; and
  generating a target three-dimensional model based on the target vertex data and the target material data, where the target three-dimensional model includes the original three-dimensional model and the three-dimensional watermark.

This embodiment provides a watermark embedding method applicable to a three-dimensional (3D for short) field, and provides a watermark embedding method applicable to a 3D field. Vertex data of an original three-dimensional model and vertex data of a three-dimensional watermark are combined, and material data of the original three-dimensional model and material data of the three-dimensional watermark are combined, so that the original three-dimensional model and the three-dimensional watermark can be synthesized into a three-dimensional model. As a result, the three-dimensional watermark is seamlessly embedded into the original three-dimensional model. In addition, before and after watermark embedding, an appearance of the original three-dimensional model can remain unchanged. This avoids. This avoids impact of watermark embedding on the appearance and use value of the three-dimensional model, and ensures a display effect of the three-dimensional model.

In an embodiment, the combining first vertex data of the original three-dimensional model and second vertex data of the three-dimensional watermark includes:
  inserting the second vertex data of the three-dimensional watermark into the first vertex data of the original three-dimensional model.

Based on this manner, achieved effects may include at least the following:

The second vertex data is inserted into the first vertex data of the original three-dimensional model. First, a function of combining the vertex data of the original three-dimensional model and the vertex data of the watermark model can be implemented. Subsequently, when the target three-dimensional model is generated based on the target vertex data, the target three-dimensional model includes each vertex in the original three-dimensional model. Therefore, it can be ensured that when the target three-dimensional model is displayed, a complete original three-dimensional model can be simultaneously displayed. This ensures a complete appearance of the original three-dimensional model, without affecting the appearance of the original three-dimensional model due to a loss of the vertex data. Second, the vertex data of the original three-dimensional model does not need to be changed, and the appearance of the original three-dimensional model is not affected by a change of the vertex data. This avoids impact of watermark embedding on the appearance of the original three-dimensional model, avoids a loss caused by watermark embedding to the use value of the original three-dimensional model, and ensures the display effect of the original three-dimensional model. Third, the vertex data of the three-dimensional watermark does not need to be modified, so as to ensure that an appearance of the three-dimensional watermark is consistent before and after being embedded into the three-dimensional model. This avoids. This avoids affecting the appearance of the three-dimensional watermark due to the change of the vertex data. That is the three-dimensional watermark can be seamlessly embedded into the original three-dimensional model.

In an embodiment, the inserting the second vertex data of the three-dimensional watermark into the first vertex data of the original three-dimensional model includes:
  randomly inserting the second vertex data of the three-dimensional watermark into the first vertex data of the original three-dimensional model.

In an embodiment, the randomly inserting the second vertex data of the three-dimensional watermark into the first vertex data of the original three-dimensional model includes:

randomly selecting two adjacent locations from a first array of the original three-dimensional model, where each location in the first array is used to store each piece of data in the first vertex data;

reading any piece of data in the second vertex data from a second array of the three-dimensional watermark, where each location in the second array is used to store each piece of data in the second vertex data; and inserting the data between the two adjacent locations.

Effects achieved by randomly inserting the vertex data of the three-dimensional watermark may include at least the following:

First, by inserting the data in the second array of the three-dimensional watermark into the first array of the original three-dimensional model, a function of combining the first array and the second array can be achieved, that is, a function of combining the first vertex data and the second vertex data is achieved. For example, the first array after the data is inserted is referred to as a first target array. Because the first target array stores both the vertex data of the original three-dimensional model and the vertex data of the three-dimensional watermark, when the target three-dimensional model is subsequently displayed based on the first target array, both vertices of the original three-dimensional model and vertices of the three-dimensional watermark can be displayed. This presents a display effect of the original three-dimensional model into which the three-dimensional watermark is embedded. Second, data of each vertex in the three-dimensional watermark is randomly located in the target vertex data, and therefore, the three-dimensional watermark cannot be easily removed or modified in the target three-dimensional model. Third, once the three-dimensional watermark fails to be removed or modified in the target three-dimensional model, data of different vertices in the target three-dimensional model is misplaced, data of the target three-dimensional model is disordered, and the target three-dimensional model cannot be normally displayed. Therefore, the three-dimensional watermark can be prevented from being removed or modified in the target three-dimensional model. In conclusion, a function of encrypting the embedded three-dimensional watermark can be implemented. This can effectively ensure the copyright of the original three-dimensional model, and better promote a digital asset such as the three-dimensional model.

In an embodiment, after the combining first vertex data of the original three-dimensional model and second vertex data of the three-dimensional watermark, the method further includes:

generating first target index data corresponding to the target vertex data based on the target vertex data, first index data corresponding to the first vertex data, and second index data corresponding to the second vertex data; where data pointed to by any first target index in the first target index data is the same as data pointed to by a corresponding first index in the first index data, or is the same as data pointed to by a corresponding second index in the second index data.

When the data pointed to by any first target index in the first target index data is the same as the data pointed to by the corresponding first index in the first index data, achieved effects may include at least the following: Because the data pointed to by the first target index in the first target index data is the same as the data pointed to by the corresponding first index in the first index data, after the target three-dimensional model is subsequently generated, when the target three-dimensional model is displayed based on the first target index data, data queried by using the first target index is the same as data queried by using the corresponding first index, and drawing effects and display effects are consistent when the data queried by using the first target index and the data queried by using the first index are used for drawing. Therefore, an appearance of the original three-dimensional model in the target three-dimensional model can be consistent with that of the original three-dimensional model. This avoids. This avoids affecting a visual effect of the original three-dimensional model and prevents watermark embedding from destroying the original use value of the original three-dimensional model.

When the data pointed to by the index in the first target index data is the same as the data pointed to by the corresponding index in the second index data, achieved effects may include at least the following: Because the data pointed to by the first target index in the first target index data is the same as the data pointed to by the corresponding second index in the second index data, data found by using the first target index is the same as data found by using the second index. Based on implementation of the function of embedding the three-dimensional watermark, the vertex data of the three-dimensional watermark is prevented from being modified in the generated target three-dimensional model. In this case, the vertex data of the target three-dimensional model can be consistent with the vertex data of the three-dimensional watermark, and an appearance of the three-dimensional watermark in the target three-dimensional model can be consistent with that of the three-dimensional watermark itself. This avoids. This avoids affecting a visual effect of the three-dimensional watermark and prevents watermark embedding from destroying original use value of the three-dimensional watermark.

In an embodiment, the generating first target index data corresponding to the target vertex data based on the target vertex data, first index data corresponding to the first vertex data, and second index data corresponding to the second vertex data includes:

combining the first index data and the second index data to obtain first candidate target index data, where the first candidate target index data includes the first index data and the second index data; and updating the first candidate target index data based on the target vertex data to obtain the first target index data.

In an embodiment, the updating the first candidate target index data based on the target vertex data includes:

for any first index in the first index data, obtaining, based on data pointed to by the first index, a first location of the data in the target vertex data; and updating a first candidate index corresponding to the first index in the first candidate target index data to an index that identifies the first location; or for any second index in the second index data, obtaining, based on data pointed to by the second index, a second location of the data in the target vertex data; and updating a first candidate index corresponding to the second index in the first candidate target index data to an index that identifies the second location.

In an embodiment, the combining first material data of the original three-dimensional model and second material data of the three-dimensional watermark includes:

inserting the second material data of the three-dimensional watermark into the first material data of the original three-dimensional model.

Based on this manner, achieved effects may include at least the following:

The second material data is inserted into the first material data of the original three-dimensional model. First, a function of combining the material data of the original three-dimensional model and the material data of the watermark model can be implemented. Subsequently, when the target three-dimensional model is generated based on the target material data, the target three-dimensional model includes each material in the original three-dimensional model. Therefore, it can be ensured that when the target three-dimensional model is displayed, a complete original three-dimensional model can be simultaneously displayed. This ensures a complete appearance of the original three-dimensional model, without affecting the appearance of the original three-dimensional model due to a loss of the material data. Second, the material data of the original three-dimensional model does not need to be changed, and the appearance of the original three-dimensional model is not affected by a change of the material data. This avoids. This avoids impact of watermark embedding on the appearance of the original three-dimensional model, avoids a loss caused by watermark embedding to the use value of the original three-dimensional model, and ensures the display effect of the original three-dimensional model. Third, the material data of the three-dimensional watermark does not need to be modified, so as to ensure that an appearance of the three-dimensional watermark is consistent before and after being embedded into the three-dimensional model. This avoids affecting the appearance of the three-dimensional watermark due to the change of the material data. That is, the effect of seamlessly embedding the three-dimensional watermark into the original three-dimensional model can be implemented.

In an embodiment, the inserting the second material data of the three-dimensional watermark into the first material data of the original three-dimensional model includes:

randomly inserting the second material data of the three-dimensional watermark into the first material data of the original three-dimensional model.

By randomly inserting the material data of the three-dimensional watermark, achieved effects may include at least the following: First, a function of combining a third array and a fourth array can be achieved by inserting data in the fourth array of the three-dimensional watermark into the third array of the original three-dimensional model, that is, the function of combining the first material data and the second material data is achieved. For example, the third array after the data is inserted is referred to as a third target array. Because the third target array stores both the material data of the original three-dimensional model and the material data of the three-dimensional watermark, when the target three-dimensional model is subsequently displayed based on the third target array, both the material of the original three-dimensional model and the material of the three-dimensional watermark can be displayed. This presents a display effect of the original three-dimensional model into which the three-dimensional watermark is embedded. Second, each piece of texture data in the three-dimensional watermark is randomly located in the target material data, and therefore, the three-dimensional watermark cannot be easily removed or modified in the target three-dimensional model. Third, once the three-dimensional watermark fails to be removed or modified in the target three-dimensional model, different material data in the target three-dimensional model is misplaced, and data of the target three-dimensional model is disordered. Therefore, the three-dimensional watermark can be prevented from being removed or modified in the target three-dimensional model. In conclusion, a function of encrypting the embedded three-dimensional watermark can be implemented, and the copyright of the original three-dimensional model can be effectively ensured. This better promotes a digital asset such as the three-dimensional model.

In an embodiment, the randomly inserting the second material data of the three-dimensional watermark into the first material data of the original three-dimensional model includes:

randomly selecting two adjacent locations from a third array of the original three-dimensional model, where each location in the third array is used to store each piece of data in the first material data;

reading any piece of data in the second material data from a fourth array of the three-dimensional watermark, where each location in the fourth array is used to store each piece of data in the second material data; and inserting the data between the two adjacent locations.

In an embodiment, the combining first material data of the original three-dimensional model and second material data of the three-dimensional watermark includes:

splicing a first map of the original three-dimensional model and a second map of the three-dimensional watermark to obtain a target map;

updating first texture data of the original three-dimensional model and second texture data of the three-dimensional watermark based on the target map; and combining the updated first texture data and the updated second texture data to obtain target texture data, where the target texture data includes the updated first texture data and the updated second texture data.

In an embodiment, after the combining first material data of the original three-dimensional model and second material data of the three-dimensional watermark, the method further includes:

generating second target index data corresponding to the target material data based on the target material data, third index data corresponding to the first material data, and fourth index data corresponding to the second material data; where data pointed to by any second target index in the second target index data is the same as data pointed to by a corresponding third index in the third index data, or is the same as data pointed to by a corresponding fourth index in the fourth index data.

When the data pointed to by the index in the second target index data is the same as the data pointed to by the corresponding index in the third index data, achieved effects may include at least the following: Because the data pointed to by the second target index in the second target index data is the same as the data pointed to by the corresponding third index in the third index data, data found by using the second target index is the same as data found by using the third index. Based on implementation of the function of embedding the three-dimensional watermark, the material data of the original three-dimensional model is prevented from being modified in the generated target three-dimensional model. In this case, material data of vertices in the target three-dimensional model can be consistent with material data of vertices in the original three-dimensional model, and an appearance of the original three-dimensional model in the target three-dimensional model can be consistent with that of the original three-dimensional model. This avoids affecting a visual effect of the original three-dimensional model and prevents watermark embedding from destroying the original use value of the original three-dimensional model.

When the data pointed to by the index in the second target index data is the same as the data pointed to by the corresponding index in the fourth index data, achieved effects may include at least the following: Because the data pointed to by the second target index in the second target index data is the same as the data pointed to by the corresponding fourth index in the fourth index data, data found by using the second target index is the same as data found by using the corresponding fourth index, and a material of a corresponding vertex in the target three-dimensional model is the same as a material of a corresponding vertex in the three-dimensional watermark. Based on implementation of the function of embedding the three-dimensional watermark, the material data of the three-dimensional watermark is prevented from being modified in the generated target three-dimensional model. In this case, the vertex data of the target three-dimensional model can be consistent with the vertex data of the three-dimensional watermark, and an appearance of the three-dimensional watermark in the target three-dimensional model can be consistent with that of the three-dimensional watermark itself. This avoids affecting a visual effect of the three-dimensional watermark and prevents watermark embedding from destroying original use value of the three-dimensional watermark.

In an embodiment, the generating second target index data corresponding to the target material data based on the target material data, third index data corresponding to the first material data, and fourth index data corresponding to the second material data includes:

combining the third index data and the fourth index data to obtain second candidate target index data, where the second candidate target index data includes the third index data and the fourth index data; and updating the second candidate target index data based on the target material data to obtain the second target index data.

In an embodiment, the updating the second candidate target index data based on the target material data to obtain the second target index data includes:

for any third index in the third index data, obtaining, based on data pointed to by the third index, a third location of the data in the target material data; and updating a second candidate index corresponding to the third index in the second candidate target index data to an index that identifies the third location; or for any fourth index in the fourth index data, obtaining, based on data pointed to by the fourth index, a fourth location of the data in the target material data; and updating a second candidate index corresponding to the fourth index in the second candidate target index data to an index that identifies the fourth location.

In an embodiment, after the generating a target three-dimensional model, the method further includes at least one of the following operations:

displaying the target three-dimensional model on a screen based on the target vertex data and the target material data;

sending the target three-dimensional model to a sharing object when a sharing instruction is received; and converting the target three-dimensional model into a binary format.

By performing format conversion on the target three-dimensional model, a data amount of the target three-dimensional model can be reduced, and a speed of sharing the target three-dimensional model can be increased.

According to a second aspect, a watermark embedding apparatus is provided, and is configured to perform the watermark embedding method in any one of the first aspect or the optional manners of the first aspect. Specifically, the watermark embedding apparatus includes a function module configured to perform the method in any one of the first aspect or the optional manners of the first aspect.

According to a third aspect, a terminal is provided, where the terminal includes a processor and a memory, the memory stores at least one instruction, and the instruction is loaded and executed by the processor to implement the watermark embedding method in any one of the first aspect or the optional manners of the first aspect.

According to a fourth aspect, a computer-readable storage medium is provided, where the computer-readable storage medium stores a computer program, and the computer program is loaded and executed by a processor to implement the watermark embedding method in any one of the first aspect or the optional manners of the first aspect.

According to a fifth aspect, a chip is provided, where the chip includes a processor and/or a program instruction, and when the chip runs, the watermark embedding method in any one of the first aspect or the optional manners of the first aspect is implemented.

According to a sixth aspect, a computer program product including an instruction is provided, and when the computer program product runs on a terminal, the terminal can implement an operation performed in the watermark embedding method in any one of the first aspect or the optional manners of the first aspect.

BRIEF DESCRIPTION OF DRAWINGS

FIG. 4 is a schematic diagram of a three-dimensional watermark according to an embodiment of this application;

FIG. 5 is a schematic diagram of first vertex data according to an embodiment of this application;

FIG. 6 is a schematic diagram of a first array according to an embodiment of this application;

FIG. 13 is a schematic diagram of texture data of an original three-dimensional model according to an embodiment of this application;

FIG. 14 is a schematic diagram of a third array according to an embodiment of this application;

FIG. 15 is a schematic diagram of a map of a three-dimensional watermark according to an embodiment of this application;

DESCRIPTION OF EMBODIMENTS

To make the objectives, technical solutions, and advantages of this application clearer, the following further describes the implementations of this application in detail with reference to the accompanying drawings.

Figure 1:
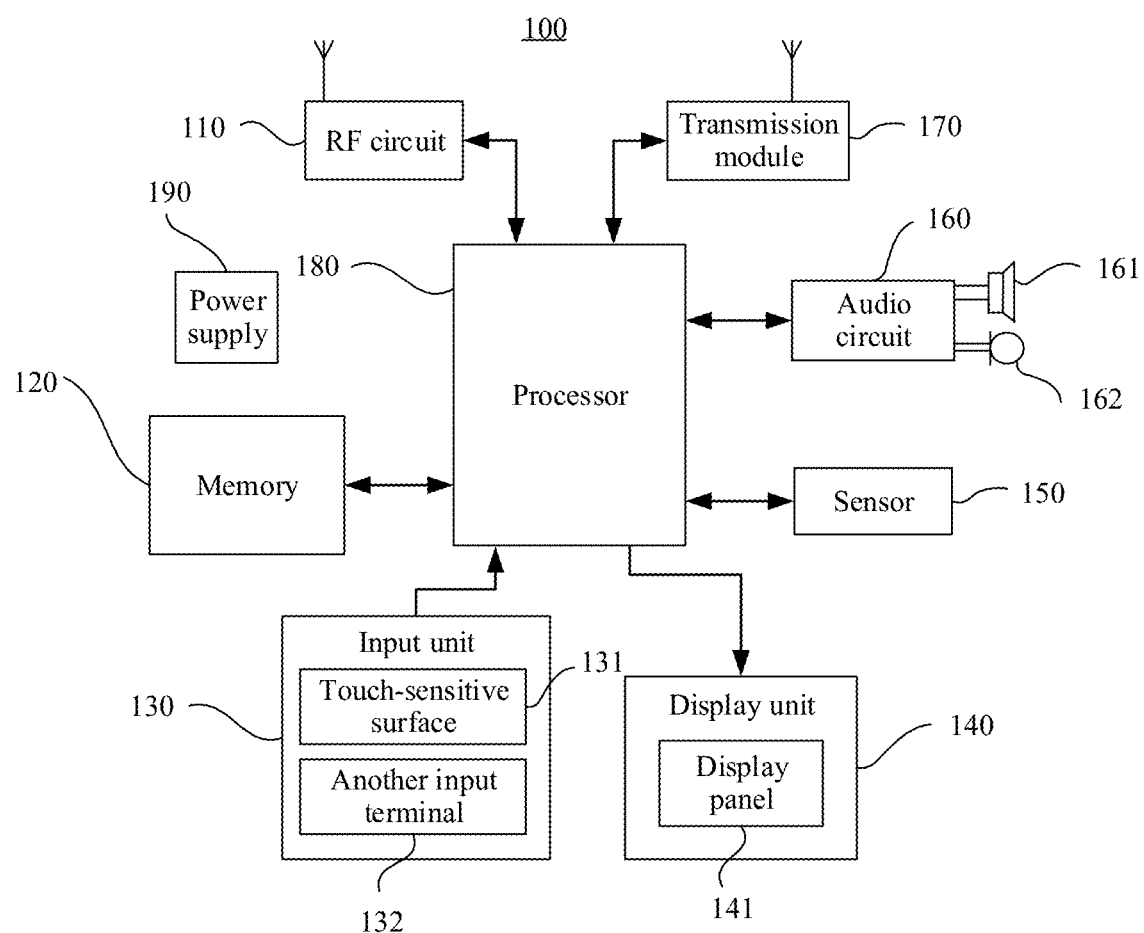
FIG. 1 is a schematic structural diagram of a terminal according to an embodiment of this application.

FIG. 1 is a schematic structural diagram of a terminal according to an embodiment of this application. The terminal may be configured to implement a function executed by a terminal in a watermark embedding method shown in the following embodiment. Details are as follows:

A terminal 100 may include parts such as a radio frequency (RF for short) circuit 110, a memory 120 that includes one or more computer readable storage media, an input unit 130, a display unit 140, a sensor 150, an audio circuit 160, a transmission module 170, a processor 180 that includes one or more processing cores, and a power supply 190. It may be understood by a person skilled in the art that, the terminal structure shown in FIG. 1 does not constitute any limitation on the terminal, and the terminal may include more or fewer components than those shown in the figure, or combine some components, or have different component arrangements.

The RF circuit 110 may be configured to: receive and send a signal in an information receiving or sending process or a call process, and in particular, after receiving downlink information from a base station, send the downlink information to one or more processor 180 for processing, and in addition, send related uplink data to the base station. Generally, the RF circuit 110 includes but is not limited to an antenna, at least one amplifier, a tuner, one or more oscillators, a subscriber identity module (SIM) card, a transceiver, a coupler, a low noise amplifier (LNA for short), a duplexer, and the like. In addition, the RF circuit 110 may further communicate with a network and another terminal through wireless communication. The wireless communication may use any communications standard or protocol, including but not limited to the Global System for Mobile communication (GSM for short), General Packet Radio Service (GPRS for short), Code Division Multiple Access (CDMA for short), Wideband Code Division Multiple Access (WCDMA for short), Long Term Evolution (LTE for short), e-mail, short message service (SMS for short), and the like.

The memory 120 may be configured to store a software program and a module, for example, a software program and a module that are corresponding to the terminal shown in the foregoing example embodiment. The processor 180 runs the software program and the module that are stored in the memory 120, so as to execute various functional applications and data processing, such as implementing video-based interaction. The memory 120 may mainly include a program storage area and a data storage area, where the program storage area may store an operating system, an application program that is required by at least one function (such as a sound playing function or an image playing function), and the like, and the data storage area may store data (such as audio data or an address book) that is created based on use of the terminal 100, and the like. In addition, the memory 120 may include a high-speed random access memory, or may include a nonvolatile memory, such as at least one magnetic disk storage component, a flash memory component, or another volatile solid-state storage component. Correspondingly, the memory 120 may further include a memory controller, to provide the processor 180 and the input unit 130 with access to the memory 120.

The input unit 130 may be configured to: receive input digital or character information, and produce signal input that is of a keyboard, a mouse, a joystick, optics, or a trackball and that is related to user setting and functional control. Specifically, the input unit 130 may include a touch-sensitive surface 131 and another input terminal 132. The touch-sensitive surface 131, also referred to as a touchscreen or a touch pad, may collect a touch operation (such as an operation that a user performs on the touch-sensitive surface 131 or near the touch-sensitive surface 131 by using a finger, a stylus, or any other suitable object or accessory) of the user on or near the touch-sensitive surface, and drive a corresponding connection apparatus based on a preset program. In an embodiment, the touch-sensitive surface 131 may include two parts: a touch detection apparatus and a touch controller. The touch detection apparatus detects a touch location of the user, detects a signal brought by a touch operation, and sends the signal to the touch controller. The touch controller receives touch information from the touch detection apparatus, converts the touch information into touch point coordinates, sends the touch point coordinates to the processor 180, and can receive and execute a command sent by the processor 180. In addition, the touch-sensitive surface 131 may be implemented by a resistive, capacitive, infrared, or surface acoustic touch-sensitive surface. In addition to the touch-sensitive surface 131, the input unit 130 may further include another input terminal 132. Specifically, the another input terminal 132 may include but is not limited to one or more of a physical keyboard, a function key (such as a volume control key or an on/off key), a trackball, a mouse, a joystick, and the like.

The display unit 140 may be configured to display information input by the user or information provided to the user, and various graphic user interfaces of the terminal 100, and the graphic user interfaces may include a graphic, a text, an icon, a video, and any combination thereof. The display unit 140 may include a display panel 141. In an embodiment, the display panel 141 may be configured in a form such as a liquid crystal display (LCD for short) or an organic light-emitting diode (OLED for short). Further, the touch-sensitive surface 131 may cover the display panel 141. When detecting the touch operation on or near the touch-sensitive surface 131, the touch-sensitive surface 131 transmits the touch operation to the processor 180 to determine a type of a touch event, and then the processor 180 provides corresponding visual output on the display panel 141 based on the type of the touch event. Although the touch-sensitive surface 131 and the display panel 141 are used as two independent components to implement input and output functions in FIG. 1, in some embodiments, the touch-sensitive surface 131 may be integrated with the display panel 141 to implement the input and output functions.

The terminal 100 may further include at least one type of sensor 150, such as a light sensor, a motion sensor, and another sensor. Specifically, the light sensor may include an ambient light sensor and a proximity sensor. The ambient light sensor may adjust luminance of the display panel 141 based on brightness of an ambient light. The proximity sensor may turn off the display panel 141 and/or backlight when the terminal 100 moves to an ear. As a motion sensor, a gravity acceleration sensor can detect a value of acceleration in each direction (generally, three axes), can detect a value and a direction of the gravity in static mode, and can be used for an application that identifies a phone gesture (such as screen orientation switching, related games, and magnetometer gesture calibration), a function related to vibration identification (such as a pedometer and a knock), and the like. For the terminal 100, a gyroscope, a barometer, a hygrometer, a thermometer, an infrared sensor, and other sensors can be further configured, which are not described in detail herein.

The audio circuit 160, a loudspeaker 161, and a microphone 162 can provide an audio interface between a user and the terminal 100. The audio circuit 160 may transmit, to the loudspeaker 161, an electrical signal converted from received audio data, and the loudspeaker 161 converts the electrical signal into a sound signal for output. In addition, the microphone 162 converts a collected sound signal into an electrical signal, the audio circuit 160 converts the electrical signal into audio data after receiving the electrical signal and outputs the audio data to the processor 180 for processing, and then the audio data is sent to, for example, another terminal by using the RF circuit 110, or the audio data is output to the memory 120 for further processing. The audio circuit 160 may probably include an earplug jack, to provide an external earphone for communicating with the terminal 100.

The terminal 100 may help, by using the transmission module 170, the user receive and send an email, browse a web page, access streaming media, and the like, and provides the user with wireless or wired broadband Internet access. Although the transmission module 170 is shown in FIG. 1, it may be understood that the transmission module 170 is not a mandatory component of the terminal 100, and may be omitted based on a requirement provided that the essence of the present invention is not changed.

The processor 180 is a control center of the terminal 100 and connects various parts of an entire mobile phone by using various interfaces and lines. The processor 180 executes various functions of the terminal 100 and processes data by running or executing the software program and/or module stored in the memory 120 and by invoking data stored in the memory 120, to perform overall monitoring on the mobile phone. In an embodiment, the processor 180 may include the one or more processing cores. Preferably, the processor 180 may integrate an application processor and a modem processor. The application processor mainly processes an operating system, a user interface, an application program, and the like, and the modem processor mainly processes wireless communication. It may be understood that the foregoing modem processor may be not integrated into the processor 180.

The terminal 100 further includes the power supply 190 (such as a battery) that supplies power to the parts. Preferably, the power supply may be logically connected to the processor 180 by using a power management system, so that functions such as charging, discharging, and power consumption management are implemented by using the power management system. The power supply 190 may further include any components such as one or more direct current or alternating current power supplies, a recharging system, a power failure detection circuit, a power converter or an inverter, and a power status indicator.

Although not shown, the terminal 100 may further include a camera, a Bluetooth module, and the like, and details are not described herein. Specifically, in an embodiment, the display unit of the terminal 100 is a touchscreen display, and the terminal 100 further includes a memory and one or more programs, where the one or more programs are stored in the memory, and after configuration, one or more processors execute the one or more programs, which include an instruction used for performing an operation performed by the terminal in the following embodiment.

In an embodiment, a computer readable storage medium is further provided, for example, a memory including an instruction, and the instruction may be executed by a processor in a terminal to complete a watermark embedding method in the following embodiment. For example, the computer readable storage medium may be a read-only memory (ROM for short), a random access memory (RAM for short), a compact disc read-only memory (CD-ROM for short), a tape, a floppy disk, or an optical data storage device.

Figure 2:
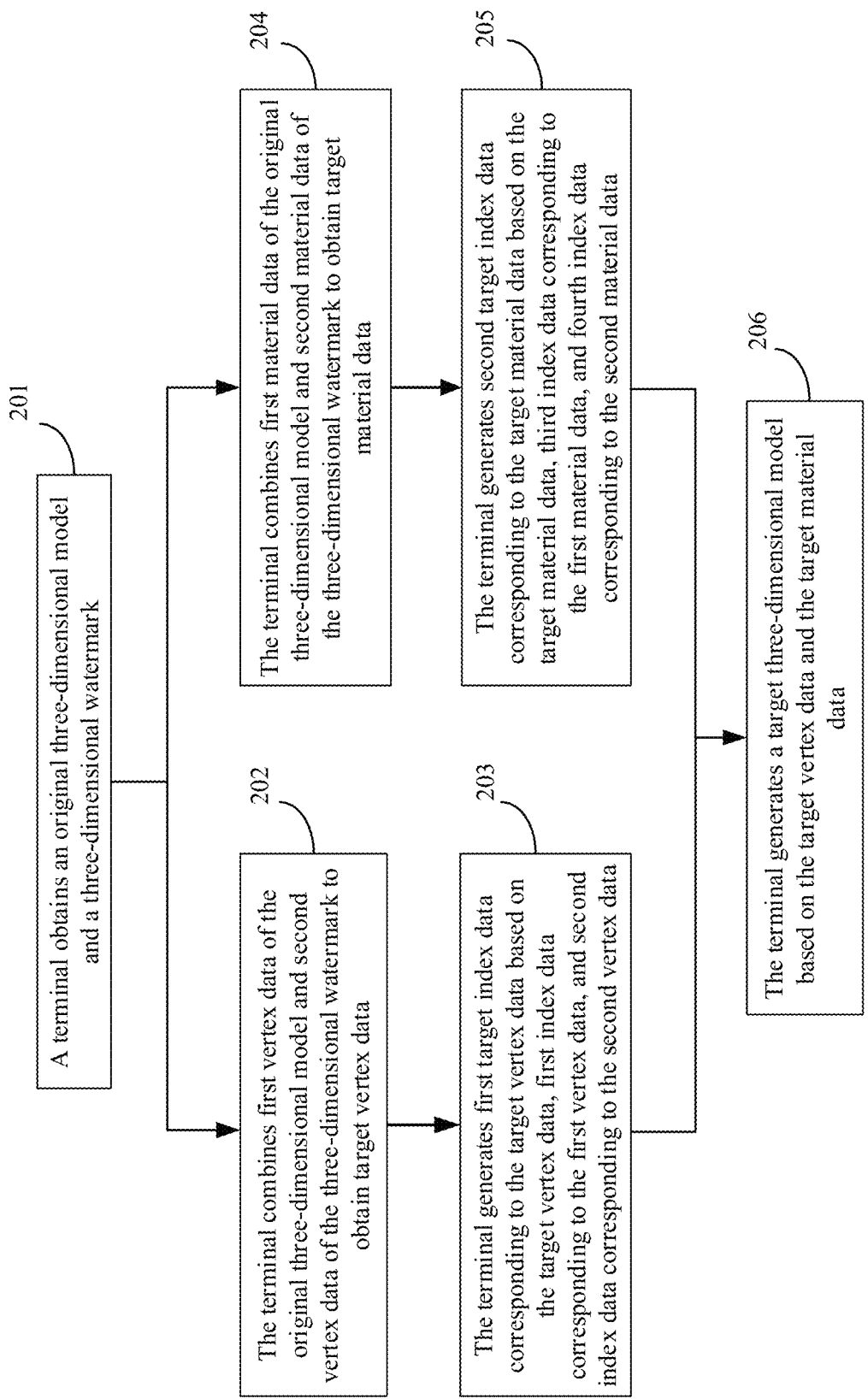
FIG. 2 is a flowchart of a watermark embedding method according to an embodiment of this application.

FIG. 2 is a flowchart of a watermark embedding method according to an embodiment of this application. The method may be executed by a terminal, and the method includes:

201. The terminal obtains an original three-dimensional model and a three-dimensional watermark.

The original three-dimensional model refers to a 3D model into which a watermark is to be embedded, and may be a digital asset. The original three-dimensional model may include a person model, an animal model, an article model, a scene model, and the like. For example, the original three-dimensional model may be shown in FIG. 3. The three-dimensional watermark may be a three-dimensional model to be embedded into the original three-dimensional model. In an embodiment, the three-dimensional watermark may carry copyright information, where the copyright information may include an identifier of a copyright owner, a creator, or an owner of the original three-dimensional model, and the identifier may include a logo, a name, or other information. For example, the three-dimensional watermark may be a model obtained after three-dimensional modeling is performed on a trademark of the copyright owner of the original three-dimensional model. For example, the three-dimensional watermark may be shown in FIG. 4.

In an embodiment, the original three-dimensional model and the manner of obtaining the three-dimensional watermark may be modeled to generate the original three-dimensional model. In an embodiment, the original three-dimensional model may be scanned to obtain the original three-dimensional model. In an embodiment, the original three-dimensional model that has been stored may be read. In an embodiment, the original three-dimensional model may be downloaded from a website or database. Certainly, the original three-dimensional model may alternatively be obtained in another manner, which is not limited in this embodiment. In addition, a manner of obtaining the three-dimensional watermark is the same as the manner of obtaining the original three-dimensional model, and details are not described herein again.

In an embodiment, the original three-dimensional model and the three-dimensional watermark may be encapsulated in a file. Correspondingly, the obtaining the original three-dimensional model and the three-dimensional watermark may include: obtaining a file of the original three-dimensional model and a file of the three-dimensional watermark. The file may include a file in an obj format, a file in a GLB format, a file in a GL transmission format (English: GL Transmission Format, gltf for short, a 3D file format which can reduce redundant data irrelevant to rendering in a 3D format and is more suitable for loading an OpenGL cluster), and the like. Certainly, the file may alternatively be configured in another format based on a requirement or experience. This is not limited in this embodiment. Certainly, the file is only an example of a storage structure of the original three-dimensional model and the three-dimensional watermark. The original three-dimensional model and the three-dimensional watermark may alternatively be encapsulated in a storage structure other than the file, for example, a data block or an object. This is not limited in this embodiment.

202. The terminal combines first vertex data of the original three-dimensional model and second vertex data of the three-dimensional watermark to obtain target vertex data.

The first vertex data is vertex data of the original three-dimensional model. The original three-dimensional model may include at least one vertex, and correspondingly, the first vertex data may include data of at least one vertex of the original three-dimensional model. In an embodiment, vertex data may include location coordinates. The location coordinates are used to identify a location of a corresponding vertex in space, and may be three-dimensional coordinates. A data format of the location coordinates may be (x, y, z). In an embodiment, the data in the first vertex data may be arranged in rows, and each row in the first vertex data is one piece of data, corresponds to one vertex of the original three-dimensional model, includes location coordinates of the vertex, and certainly may further include annotation content or other content.

In an embodiment, if the original three-dimensional model is encapsulated in a file, a process of obtaining the first vertex data may include: parsing the file of the original three-dimensional model to obtain the first vertex data in the file. Specifically, for example, the original three-dimensional model is a file in an obj format. In the file in the obj format, a row header v is usually used to identify vertex data, and the process of obtaining the first vertex data may include: determining each row of data that is in the file in the obj format of the original three-dimensional model and whose row header is v, and using obtained at least one row of data as the first vertex data.

In an embodiment, it is assumed that the original three-dimensional model includes a vertex a1, a vertex b1, and a vertex c1. FIG. 5 is a schematic diagram of the first vertex data. The first vertex data may include three rows of data, the first row of data is data of the vertex a1, the second row of data is data of the vertex b1, and the third row of data is data of the vertex c1. For example, the vertex data is location coordinates. The first row of data in FIG. 5 is v 2.59562 −10.0518 3.48815, indicating that location coordinates of the vertex a1 are (2.59562, −10.0518, 3.48815), where the x coordinate is 2.59562, they coordinate is −10.0518, and the z coordinate is 3.48815. Data of another vertex is similar to this example.

In an embodiment, the first vertex data may be stored in an array. Specifically, for example, an array for storing the first vertex data is referred to as a first array. The first array may include at least one location, and any data of the first vertex data may be stored at any location of the first array. When the original three-dimensional model is obtained, the first array may be cached in a memory, and the first array may occupy continuous memory space. For example, the first array may be shown in FIG. 6. Data of a vertex 1 may be recorded as ver(1) in a program, that is, vertex(1), where vertex means a vertex. The data of the vertex 1 may be stored at the first location of the first array. Data of a vertex 2 may be recorded as ver(2) in the program, that is, vertex(2). The data of the vertex 2 may be stored at the second location of the first array, and so on. Certainly, the first vertex data may alternatively be stored in a storage structure other than the array, such as a hash table, a linked table, a red-black tree, or another storage structure. This is not limited in this embodiment.

The second vertex data is vertex data of the three-dimensional watermark. The three-dimensional watermark may include at least one vertex, and correspondingly, the second vertex data may include data of at least one vertex of the three-dimensional watermark. In an embodiment, the data in the second vertex data may be arranged in rows, and each row in the second vertex data is one piece of data, corresponds to one vertex of the three-dimensional watermark, includes location coordinates of the vertex, and certainly may further include annotation content or other content.

In an embodiment, if the three-dimensional watermark is encapsulated in a file, a process of obtaining the second vertex data may include: parsing the file of the three-dimensional watermark to obtain the second vertex data in the file. Specifically, for example, the three-dimensional watermark is a file in the obj format, and the process of obtaining the second vertex data may include: determining each row of data that is in the file in the obj format of the three-dimensional watermark and whose row header is v, and using obtained at least one row of data as the second vertex data.

In an embodiment, the second vertex data may be stored in an array. Specifically, for example, an array for storing the second vertex data is referred to as a second array. The second array may include at least one location, and any data of the second vertex data may be stored at any location of the second array. A structure of the second array is similar to a structure of the first array, and details are not described herein again. Certainly, the second vertex data may alternatively be stored in a storage structure other than the array, which is not limited in this embodiment.

The target vertex data is vertex data of a target three-dimensional model. The target three-dimensional model is a three-dimensional model obtained after the three-dimensional watermark is embedded into the original three-dimensional model, and may be considered as a model that combines the original three-dimensional model and the three-dimensional watermark. The target three-dimensional model may include at least one vertex, and correspondingly, the target vertex data may include data of at least one vertex of the target three-dimensional model. In an embodiment, the data in the target vertex data may be arranged in rows, and each row in the target vertex data is one piece of data and corresponds to one vertex of the target three-dimensional model.

The target vertex data includes the first vertex data and the second vertex data, and may be considered as a combination of the first vertex data and the second vertex data. For example, it is assumed that first vertex data of an original three-dimensional model includes data of n vertices, and a three-dimensional watermark includes data of m vertices, target vertex data in a target three-dimensional model obtained by embedding the three-dimensional watermark into the original three-dimensional model may include data of (m+n) vertices, where both m and n are positive integers.

In an embodiment, the target vertex data may be stored in an array. Specifically, for example, an array for storing the target vertex data is referred to as a first target array. The first target array may include at least one location, and any data of the target vertex data may be stored at any location of the first target array. The first target array may be generated by the terminal. The first target array may store data stored at each location in the first array and data stored at each location in the second array, so as to store data of each vertex of the original three-dimensional model and data of each vertex of the three-dimensional watermark.

Effects of combining the first vertex data and the second vertex data may at least include the following:

The target vertex data includes the data of each vertex in the original three-dimensional model and the data of each vertex in the three-dimensional watermark. When the target three-dimensional model is subsequently generated based on the target vertex data, the target three-dimensional model includes each vertex in the original three-dimensional model. Therefore, it can be ensured that a complete original three-dimensional model can be displayed simultaneously when the target three-dimensional model is displayed. This ensures that an appearance of the original three-dimensional model is complete, and the appearance of the three-dimensional model is not affected by a loss of the vertex data. In addition, the vertex data of the original three-dimensional model does not need to be modified, so as to ensure that the appearance of the original three-dimensional model is consistent before and after the three-dimensional watermark is embedded, and the appearance of the three-dimensional model is not affected by a change of the vertex data. Similarly, it can be ensured that a complete three-dimensional watermark can be displayed simultaneously when the target three-dimensional model is displayed, so that a complete appearance of the three-dimensional watermark is ensured, and the appearance of the three-dimensional watermark is not affected by a loss of the vertex data. In addition, the vertex data of the three-dimensional watermark does not need to be modified, so as to ensure that an appearance of the three-dimensional watermark is consistent before and after being embedded into the three-dimensional model. This avoids affecting the appearance of the three-dimensional watermark due to the change of the vertex data. That is, the effect of seamlessly embedding the three-dimensional watermark into the original three-dimensional model can be implemented.

For a manner of combining the first vertex data and the second vertex data, in an embodiment, the terminal may insert the second vertex data of the three-dimensional watermark into the first vertex data of the original three-dimensional model to obtain the target vertex data. Correspondingly, the target vertex data is the first vertex data into which the second vertex data is inserted. Specifically, any data in the second vertex data may be inserted between different data in the first vertex data. If each piece of data in the first vertex data is arranged in rows, inserting data between different data in the first vertex data may include: inserting the data as a newly added row in the first vertex data between any two rows in the first vertex data. If each piece of data in the first vertex data is stored in the first array, the inserting data between different data in the first vertex data may include: selecting two adjacent locations from the first array of the original three-dimensional model; and inserting data of any vertex of the three-dimensional watermark between the two adjacent locations of the first array.

For a manner of obtaining any data in the second vertex data, if the second vertex data may be stored in an array, and it is assumed that an array for storing the second vertex data is referred to as a second array, any data in the second vertex data may be read from any location in the second array, for example, a location in the array is queried by using an array subscript, and then data is read from the location. Certainly, the second vertex data may alternatively be stored in a storage structure other than the array, and any data in the second vertex data may be read from the storage structure other than the array.

Figure 7:
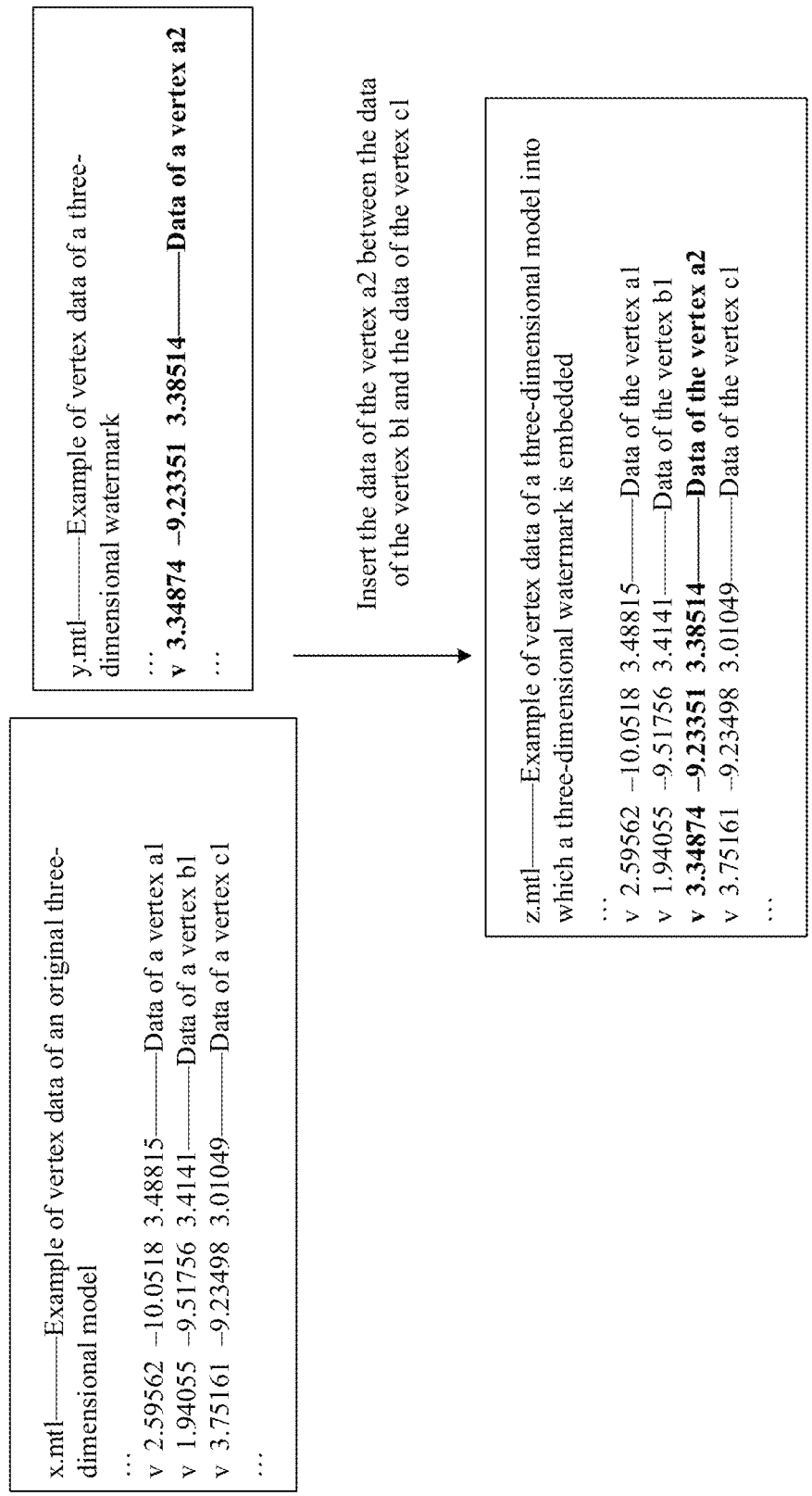
FIG. 7 is a schematic diagram of inserting second vertex data into first vertex data according to an embodiment of this application.

For example, referring to FIG. 7, the first vertex data of the original three-dimensional model includes three rows of data, the first row of data is data of a vertex a1, the second row of data is data of a vertex b1, and the third row of data is data of a vertex c1. The first row of data in the second vertex data of the three-dimensional watermark, that is, data of a vertex a2, may be inserted between the second row of data and the third row of data of the first vertex data. Therefore, in the target vertex data obtained after insertion, the third row of data is the data of the vertex a2, and the fourth row of data is the data of the vertex c1. By analogy, it is assumed that the first vertex data includes n rows of data, and the second vertex data includes m rows of data. After the second vertex data is inserted into the first vertex data, the first vertex data may include m+n rows of data, where m and n are positive integers.

In an embodiment, inserting the second vertex data into the first vertex data may mean inserting the second vertex data into the first vertex data of the original three-dimensional model, or may mean generating a copy of the first vertex data and inserting the second vertex data into the copy of the first vertex data. This is not limited in this embodiment.

In an embodiment, the vertex data may be inserted randomly, and the second vertex data of the three-dimensional watermark may be randomly inserted into the first vertex data of the original three-dimensional model to obtain the target vertex data. Therefore, the target vertex data is the first vertex data into which the second vertex data is randomly inserted. Specifically, any data in the second vertex data may be randomly inserted between different data in the first vertex data. If each piece of data in the first vertex data is arranged in rows, inserting data between different data in the first vertex data may include: randomly inserting the data as a newly added row in the first vertex data between any two rows in the first vertex data. If each piece of data in the first vertex data is stored in the first array, the inserting data between different data in the first vertex data may specifically include the following operations 1 to 3:

Operation 1: Randomly select two adjacent locations from the first array of the original three-dimensional model.

Two adjacent locations may be selected from all locations of the first array in any random selection manner, which is not limited in this embodiment. For example, the first location and the last location in the first array may be determined, a range from the first location to the last location is used as a value range to generate a random number that belongs to the value range, the random number is used as a selected location, and an adjacent location of the location is used as the other selected location to obtain two adjacent locations.

Operation 2: Read any data in the second vertex data from the second array of the three-dimensional watermark.

Any data from the second array may be read based on any preset policy, which is not limited in this embodiment. For example, each piece of data may be successively read from the second array in a sequence of locations in the second array. For example, data is first read from the first location in the second array, and then data is read from the second location in the second array until a data location is read from the last location in the second array. In a mathematical expression manner, it is assumed that the second array is ver(1) to ver(n), data of ver(1) may be read first, and then data of ver(2) is read until data of ver(n) is read.

Operation 3: Insert the data between the two adjacent locations.

A location may be added between two adjacent locations of the first array, and data in the second vertex data is inserted into the newly added location of the first array, so that the first array stores the data in the second vertex data.

Figure 8:
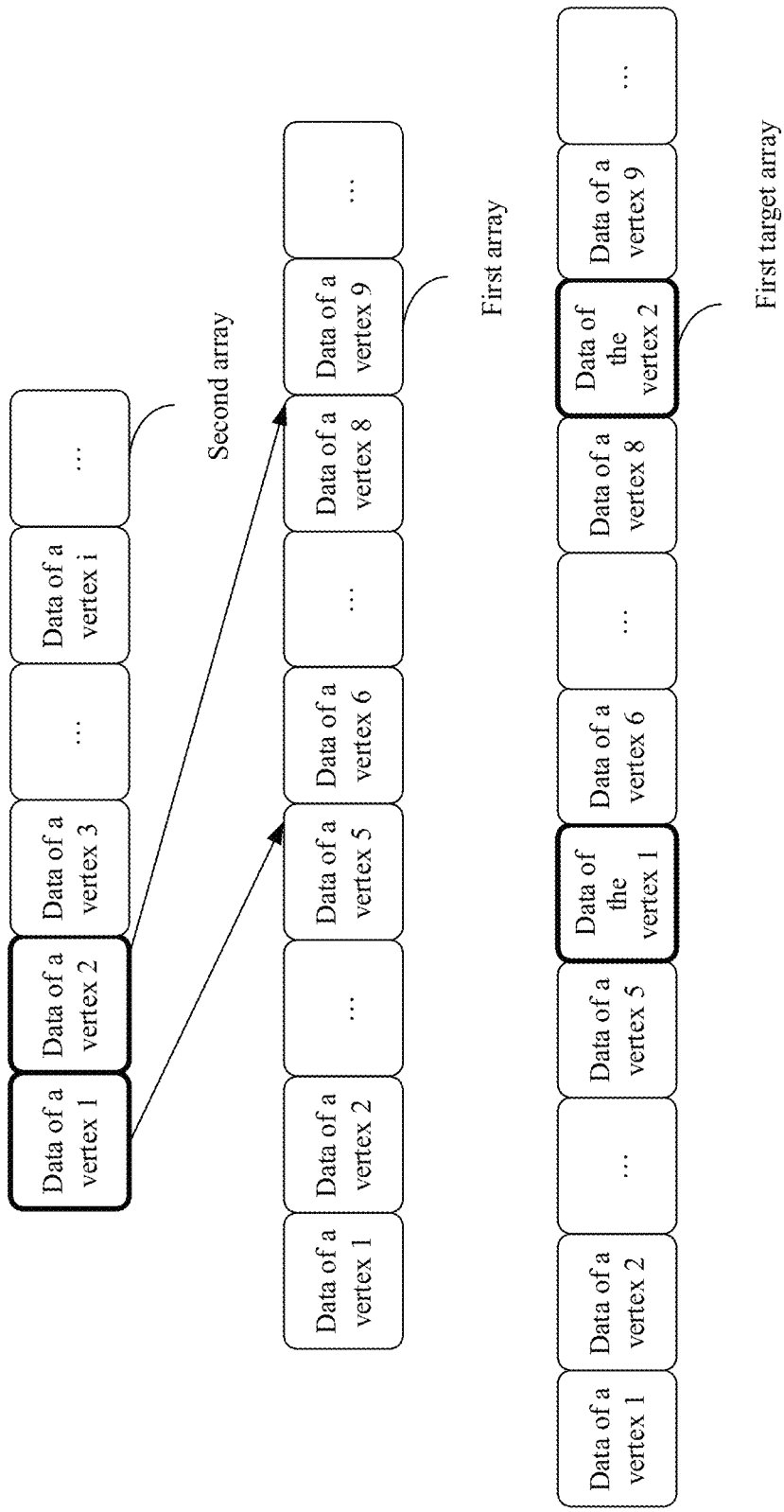
FIG. 8 is a schematic diagram of inserting second vertex data into first vertex data according to an embodiment of this application.

For example, bold black boxes in FIG. 8 indicate to-be-inserted data in the second vertex data. The fifth location and the sixth location may be randomly selected from the first array of the original three-dimensional model, data of a vertex 1 is read from the second array of the three-dimensional watermark, that is, ver(1), and ver(1) is inserted between the fifth location and the sixth location of the first array. Similarly, the eighth location and the ninth location are randomly selected from the first array of the original three-dimensional model, data of a vertex 2 is read from the second array of the three-dimensional watermark, that is, ver(2), and ver(2) is inserted between the eighth location and the ninth location of the first array.

Effects achieved by randomly inserting the vertex data of the three-dimensional watermark may include at least the following:

First, by inserting the data in the second array of the three-dimensional watermark into the first array of the original three-dimensional model, a function of combining the first array and the second array can be achieved, that is, a function of combining the first vertex data and the second vertex data is achieved. The first array after the data is inserted is the foregoing first target array. Because the first target array stores both the vertex data of the original three-dimensional model and the vertex data of the three-dimensional watermark, when the target three-dimensional model is subsequently displayed based on the first target array, both vertices of the original three-dimensional model and vertices of the three-dimensional watermark can be displayed. This presents a display effect of the original three-dimensional model into which the three-dimensional watermark is embedded.

Second, a location of data of each vertex in the three-dimensional watermark is random in the target vertex data. For example, data of a vertex a2 is located in the second row, data of a vertex b2 is located in the tenth row, and data of a vertex c2 is located in the eighth row. Therefore, the three-dimensional watermark cannot be easily removed or modified in the target three-dimensional model. Third, once the three-dimensional watermark fails to be removed or modified in the target three-dimensional model, data of different vertices in the target three-dimensional model is misplaced, data of the target three-dimensional model is disordered, and the target three-dimensional model cannot be normally displayed. Therefore, the three-dimensional watermark can be prevented from being removed or modified in the target three-dimensional model. In conclusion, a function of encrypting the embedded three-dimensional watermark can be implemented, and the copyright of the original three-dimensional model can be effectively ensured. This better promotes a digital asset such as the three-dimensional model.

In an embodiment, the vertex data may be inserted dispersedly, and the second vertex data of the three-dimensional watermark may be dispersedly inserted into the first vertex data of the original three-dimensional model to obtain the target vertex data. Specifically, different data in the second vertex data may be inserted at different locations in the first vertex data, so that a plurality of pieces of data in the second vertex data are not adjacent to each other as far as possible in the first vertex data. In addition, data of a preset quantity of vertices may be selected from the second vertex data each time, and the data of these vertices may be inserted into the first vertex data. The preset quantity may be relatively small such as 1, to implement a dispersed insertion function.

It should be noted that, random insertion may be an optional manner of inserting the second vertex data of the watermark model, not a mandatory manner. In an embodiment, the second vertex data of the watermark model may alternatively be inserted in a manner other than random insertion. For example, each piece of data in the second array is successively inserted between every two adjacent locations in the first array, for example, between the first location and the second location in the first array, and between the second location and the third location in the first array, until all of the second vertex data is inserted. Certainly, the second vertex data may alternatively be inserted in another manner. The manner of inserting the second vertex data into the first vertex data is not limited in this embodiment.

It should be further noted that, inserting the second vertex data of the watermark model may be only an optional manner of combining the vertex data of the two three-dimensional models, not a mandatory manner. In an embodiment, the vertex data of the two three-dimensional models may be combined in a manner other than the manner of inserting the second vertex data. For example, the second vertex data of the three-dimensional watermark and the first vertex data of the original three-dimensional model may be sorted and combined based on any preset policy to obtain the target vertex data. The first vertex data and the second vertex data may be sequentially concatenated into the target vertex data. For another example, each piece of data in the second array may be successively inserted between every two adjacent locations in a sequence from the first location to the last location in the first array. Certainly, the second vertex data may alternatively be inserted in another manner. The manner of combining the first vertex data and the second vertex data is not limited in this embodiment.

203. The terminal generates first target index data corresponding to the target vertex data based on the target vertex data, first index data corresponding to the first vertex data, and second index data corresponding to the second vertex data.

The first index data is used to query data of a corresponding vertex in the original three-dimensional model. The first vertex data may include data of at least one vertex of the original three-dimensional model, and correspondingly, the first index data may include an index of at least one vertex of the original three-dimensional model. For example, any index in the first index data is referred to as a first index. Each first index is in a one-to-one correspondence with each vertex in the first vertex data, and any first index is used to query data of a vertex that is in the original three-dimensional model and corresponding to the first index. In an embodiment, if data of each vertex in the first vertex data occupies one row, correspondingly, the first index may be a row identifier of a row in which the data of the corresponding vertex is located. The row identifier is used to identify a row in which data of a vertex is located, and may be a row number.

In an embodiment, a plane may be used as a component element of the original three-dimensional model. The original three-dimensional model may include at least one plane, and each plane includes at least three vertices. Correspondingly, the first index data may be plane index data, and the first index data may include indexes of vertices in at least one plane of the original three-dimensional model. Further, a triangular plane may be used as a component element of the original three-dimensional model. The original three-dimensional model may include at least one triangular plane, and each triangular plane includes three vertices. Correspondingly, the first index data may include indexes of vertices in at least one triangular plane of the original three-dimensional model.

For example, referring to FIG. 5, it is assumed that a triangular plane of the original three-dimensional model includes a vertex a1, a vertex b1, and a vertex c1. Data of the vertex a1 is located in the first row of the first vertex data, data of the vertex b1 is located in the second row of the first vertex data, and data of the vertex c1 is located in the third row of the first vertex data. Indexes corresponding to the triangular plane in the first index data may be f 1 2 3, where 1 is an index of the vertex a1, is a row identifier of the first row in the first vertex data, and can be indexed to the first row, so as to query the data of the vertex a1, and 2 is an index of the vertex b1, is a row identifier of the second row in the first vertex data, and can be indexed to the second row, so as to query the data of the vertex b1. By analogy, it is assumed that the original three-dimensional model includes n vertices, the first vertex data includes n rows, and the first index data may include 1 to n, where n is a positive integer.

In an embodiment, if the original three-dimensional model is encapsulated in a file, a process of obtaining the first index data may include: parsing the file of the original three-dimensional model to obtain the first index data in the file. For example, the original three-dimensional model is a file in the obj format. In the file in the obj format, a row header f is usually used to identify index data. In this case, each row of data that is in the file in the obj format and whose row header is f may be determined, and obtained at least one row of data is used as the first index data.

Figure 9:
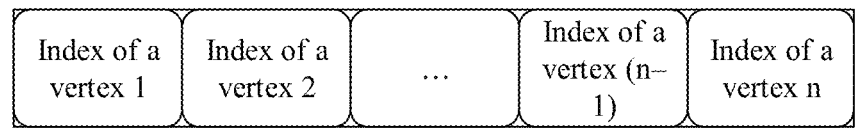
FIG. 9 is a schematic diagram of a fifth array according to an embodiment of this application.

In an embodiment, the first index data may be stored in an array. Specifically, for example, an array for storing the first index data is referred to as a fifth array. The fifth array may include at least one location, and any first index may be stored at any location of the fifth array. When the original three-dimensional model is obtained, the fifth array may be cached in a memory, and the fifth array may occupy continuous memory space. For example, the fifth array may be shown in FIG. 9. An index of a vertex 1 may be recorded as index(1) in a program, the index of the vertex 1 may be stored at the first location of the fifth array, an index of a vertex 2 may be recorded as index(2) in the program, and the index of the vertex 2 may be stored at the second location of the fifth array, where "index" represents an index, and so on. Certainly, the first index data may alternatively be stored in a storage structure other than the array, which is not limited in this embodiment.

The second index data is used to query data of a corresponding vertex in the three-dimensional watermark. The second vertex data may include data of at least one vertex of the three-dimensional watermark, and correspondingly, the second index data may include an index of at least one vertex of the three-dimensional watermark. For example, any index in the second index data is referred to as a second index. Each second index is in a one-to-one correspondence with each vertex in the second vertex data, and any second index is used to query data of a vertex that is in the three-dimensional watermark and corresponding to the second index. In an embodiment, if each piece of data in the second vertex data occupies one row, correspondingly, each second index may be a row identifier. The row identifier is used to identify a row in which corresponding data is located, and may be a row number.

In an embodiment, a plane may be used as a component element of the three-dimensional watermark. The three-dimensional watermark may include at least one plane, and each plane includes at least three vertices. Correspondingly, the second index data may be plane index data, and the second index data may include indexes of vertices in at least one plane of the three-dimensional watermark. Further, a triangular plane may be used as a component element of the three-dimensional watermark. The three-dimensional watermark may include at least one triangular plane, and each triangular plane includes three vertices. Correspondingly, the second index data may include indexes of vertices in at least one triangular plane of the three-dimensional watermark.

For example, it is assumed that a triangular plane of the three-dimensional watermark includes a vertex a2, a vertex b2, and a vertex c2. Data of the vertex a2 is located in the first row of the second vertex data, data of the vertex b2 is located in the second row of the second vertex data, and data of the vertex c2 is located in the third row of the second vertex data. Indexes corresponding to the second index data in the triangular plane may be f 1 2 3, where 1 is an index of the vertex a2, is a row identifier of the first row in the second vertex data, and can be indexed to the first row, so as to query the data of the vertex a2, and 2 is an index of the vertex b2, is a row identifier of the second row in the second vertex data, and can be indexed to the second row, so as to query the data of the vertex b2. By analogy, it is assumed that the three-dimensional watermark includes k vertices, the second vertex data includes k rows, and the second index data may include 1 to k, where k is a positive integer.

In an embodiment, if the three-dimensional watermark is encapsulated in a file, a process of obtaining the second index data may include: parsing the file of the three-dimensional watermark to obtain the second index data in the file. For example, the three-dimensional watermark is a file in the obj format. In the file in the obj format, a row header f is usually used to identify index data. In this case, each row of data that is in the file in the obj format and whose row header is f may be determined, and obtained at least one row of data is used as the second index data.

In an embodiment, the second index data may be stored in an array. Specifically, for example, an array for storing the second index data is referred to as a sixth array. The sixth array may include at least one location, and any index of the second index data may be stored at any location of the sixth array. When the three-dimensional watermark is obtained, the sixth array may be cached in a memory, and the sixth array may occupy continuous memory space. Certainly, the second index data may alternatively be stored in a storage structure other than the array, which is not limited in this embodiment.

The first target index data is used to query data of a corresponding vertex in the target three-dimensional model. The target vertex data may include data of at least one vertex of the target three-dimensional model. Correspondingly, the first target index data may include an index of at least one vertex of the target three-dimensional model, each index in the first target index data is in a one-to-one correspondence with each vertex of the target vertex data, and any index is used to query data of a vertex corresponding to the index. In an embodiment, if each piece of data in the target vertex data occupies one row, correspondingly, each index in the first target index data may be a row identifier. The row identifier is used to identify a row in which corresponding data is located, and may be a row number.

In an embodiment, a plane may be used as a component element of the target three-dimensional model. The target three-dimensional model may include at least one plane, and each plane includes at least three vertices. Correspondingly, the first target index data may be plane index data, and the first target index data may include indexes of vertices in at least one plane of the target three-dimensional model. Further, a triangular plane may be used as a component element of the target three-dimensional model. The target three-dimensional model may include at least one triangular plane, and each triangular plane includes three vertices. Correspondingly, the first target index data may include indexes of vertices in at least one triangular plane of the target three-dimensional model.

In an embodiment, the first target index data may be stored in an array. Specifically, for example, an array for storing the first target index data is referred to as a second target array. The second target array may include at least one location, and any index in the first target index data may be stored at any location of the second target array. The second target array may be obtained by combining the fifth array and the sixth array. For example, the fifth array into which the index of the sixth array is inserted may be used as the second target array. The second target array may occupy continuous memory space. Certainly, the first target index data may alternatively be stored in a storage structure other than the array, which is not limited in this embodiment.

For example, any index in the first target index data is referred to as a first target index, and data pointed to by the first target index in the first target index data may include any one of the following cases (1) and (2):

Case (1): The data pointed to by the first target index is the same as the data pointed to by the corresponding first index in the first index data.

The data pointed to by the first target index may be data in the target vertex data. The data pointed to by the first index may be data in the first vertex data. For a correspondence between the first target index and the first index, that any first target index corresponds to any first index may mean that triangular planes corresponding to the two indexes and vertices on the triangular planes are the same. For example, if the first index is an index of a pth vertex of an mth triangular plane of the original three-dimensional model, the first target index is an index of a pth vertex of an mth triangular plane of the target three-dimensional model, and it may be considered that the first target index corresponds to the first index, where m and p are positive integers.

In an embodiment, a location of the first target index in the first target index data may be the same as a location of the first index in the first index data. Specifically, if the index data is arranged in rows, and each row includes a plurality of indexes, that the first target index corresponds to the first index may mean that a row in which the first target index is located in the first target index data and a location in which the first target index is located in the row are the same as a row in which the first index is located in the first index data and a location in which the first index is located in the row. In addition, if the index data is stored in an array, that the first target index corresponds to the first index may mean that a location of the first target index in the second target array is the same as a location of the first index in the fifth array. For example, an array subscript of the first target index in the second target array is the same as an array subscript of the first index in the fifth array.

Figure 10:
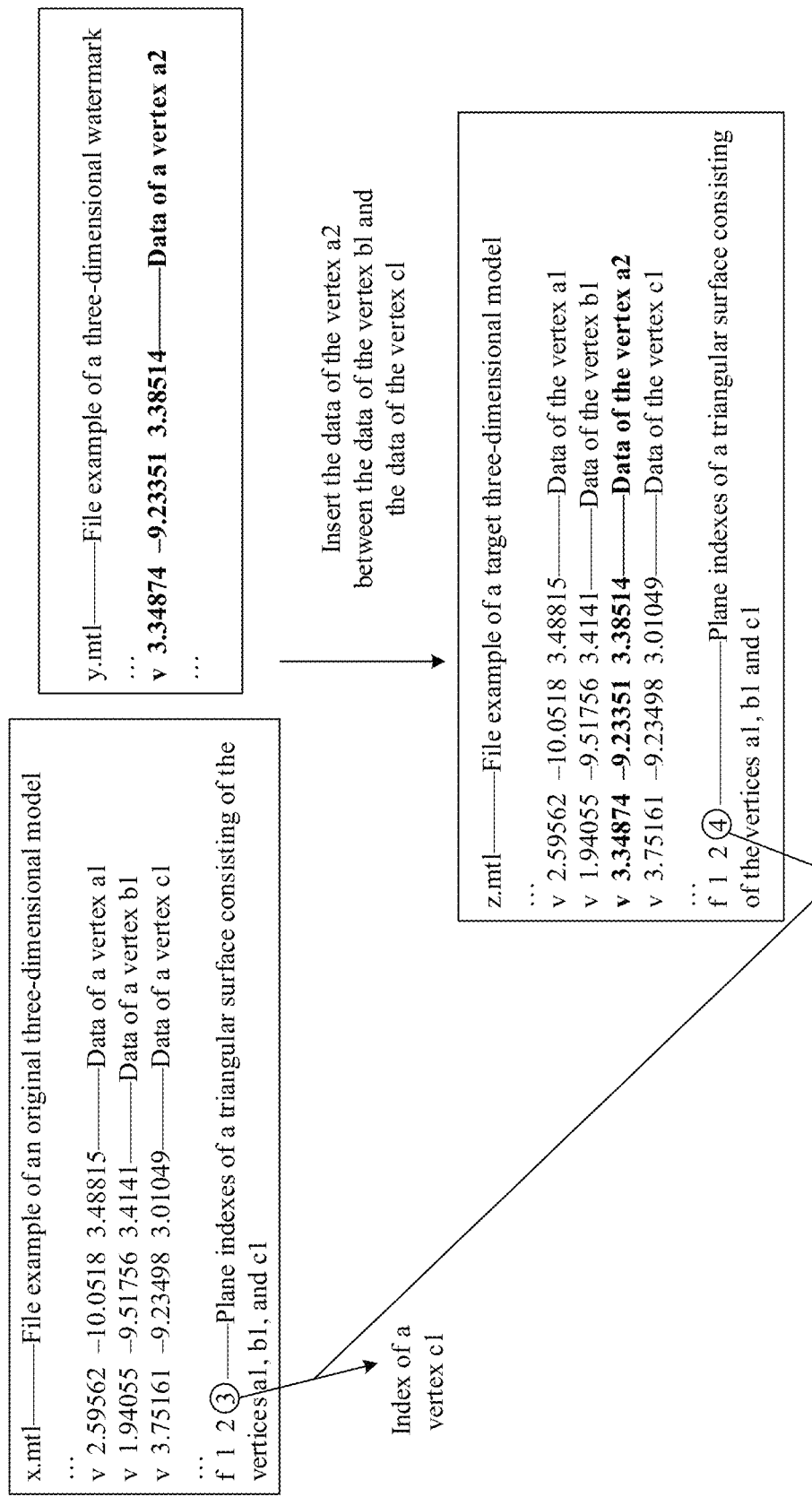
FIG. 10 is a schematic diagram of updating an index of vertex data according to an embodiment of this application.

For example, referring to FIG. 10, it is assumed that the first index data is f 1 2 3, where 1 points to the first row of data v 2.59562 −10.0518 3.48815 of the first vertex data, 2 points to the second row of data v 1.94055 −9.51756 3.4141 of the first vertex data, and 3 points to the third row of data v 3.75161 −9.23498 3.01049 of the first vertex data. The first target index data is f 1 2 4, where 1 points to the first row of data v 2.59562 −10.0518 3.48815 of the target vertex data, 2 points to the second row of data v1.94055 −9.51756 3.4141 of the target vertex data, and 4 points to the fourth row of data v 3.75161 −9.23498 3.01049 of the target vertex data. Then, 1 in the first target index data corresponds to 1 in the first index data, 2 in the first target index data corresponds to 2 in the first index data, and 4 in the first target index data corresponds to 3 in the first index data.

Effects achieved in case (1) may include at least the following:

Because the data pointed to by the first target index in the first target index data is the same as the data pointed to by the first index in the first index data, after the target three-dimensional model is subsequently generated, when the target three-dimensional model is displayed based on the first target index data, data queried by using the first target index is the same as data queried by using the corresponding first index, and drawing effects and display effects are consistent when the data queried by using the first target index and the data queried by using the first index are used for drawing. Therefore, an appearance of the original three-dimensional model in the target three-dimensional model can be consistent with that of the original three-dimensional model. This avoids affecting a visual effect of the original three-dimensional model and prevents watermark embedding from destroying the original use value of the original three-dimensional model.

Case (2): The data pointed to by the first target index is the same as the data pointed to by the corresponding second index.

For a correspondence between the first target index and the second index, that any first target index corresponds to any second index may mean that triangular planes corresponding to the two indexes and vertices on the triangular planes are the same. For example, if the second index is an index of a pth vertex of an mth triangular plane of the three-dimensional watermark, the first target index is an index of a pth vertex of an mth triangular plane of the target three-dimensional model, and it may be considered that the first target index corresponds to the second index, where m and p are positive integers.

In an embodiment, a location of the first target index in the first target index data may be the same as a location of the second index in the second index data. Specifically, if the index data is arranged in rows, and each row includes a plurality of indexes, that the first target index corresponds to the second index may mean that a row in which the first target index is located in the first target index data and a location in which the first target index is located in the row are the same as a row in which the second index is located in the second index data and a location in which the second index is located in the row. In addition, if the index data is stored in an array, that the first target index corresponds to the second index may mean that a location of the first target index in the second target array is the same as a location of the second index in the sixth array. For example, an array subscript of the first target index in the second target array is the same as an array subscript of the second index in the sixth array.

Effects achieved in case (2) may include at least the following:

Because the data pointed to by the first target index in the first target index data is the same as the data pointed to by the corresponding second index in the second index data, data found by using the first target index is the same as data found by using the second index. Based on implementation of the function of embedding the three-dimensional watermark, the vertex data of the three-dimensional watermark is prevented from being modified in the generated target three-dimensional model. In this case, the vertex data of the target three-dimensional model can be consistent with the vertex data of the three-dimensional watermark, and an appearance of the three-dimensional watermark in the target three-dimensional model can be consistent with that of the three-dimensional watermark itself. This avoids affecting a visual effect of the three-dimensional watermark and prevents watermark embedding from destroying original use value of the three-dimensional watermark.

In an embodiment, a process of generating the first target index data may include the following operations 1 and 2:

Operation 1: Combine the first index data and the second index data to obtain first candidate target index data.

The first candidate target index data is data obtained after the first index data and the second index data are combined, and the first candidate target index data includes the first index data and the second index data. A manner of combining the first index data and the second index data may be similar to the manner of combining the first vertex data and the second vertex data. Specifically, the second index data may be inserted into the first index data. For example, a process of inserting any second index may include: selecting two adjacent locations from the fifth array of the original three-dimensional model; reading any second index in the second index data from the sixth array of the three-dimensional watermark; and inserting the second index between the two adjacent locations of the fifth array.

Further, an insertion location of the second index data may correspond to an insertion location of the second vertex data. Specifically, for any second index in the second index data, when two adjacent locations selected from the fifth array for inserting the second index may be the same as two adjacent locations selected from the first array for inserting data that is of a vertex of the three-dimensional watermark and pointed to by the second index, an insertion location of the second index in the fifth array corresponds to an insertion location of the data, pointed to by the second index, in the first array. For example, it is assumed that data of a vertex ver(m) of the three-dimensional watermark is inserted between the third location and the fourth location of the first array of the original three-dimensional model. When an index index(m) of the data of the vertex ver(m) is inserted, index(m) may be inserted between the third location and the fourth location of the fifth array of the original three-dimensional model.

Operation 2: Update the first candidate target index data based on the target vertex data to obtain the first target index data.

In an embodiment, a process of updating the first candidate target index data may include the following operations (1.1) and (1.2).

Operation (1.1): For any first index in the first index data, obtain, based on data pointed to by the first index, a first location of the data in the target vertex data.

The first location is a location of any data in the first vertex data in the target vertex data, and the first index may be used to identify the first location. If each piece of data in the target vertex data occupies one row, obtaining the first location of the data of the first vertex data in the target vertex data may mean obtaining a row in which the data in the first vertex data is located in the target vertex data. In addition, if the target vertex data is stored in the first target array, obtaining the first location of the data in the target vertex data may mean obtaining a location of the data in the first target array, for example, obtaining an array subscript of the data in the first target array.

Operation (1.2): Update a first candidate index corresponding to the first index in the first candidate target index data to an index that identifies the first location.

A row in which the first candidate index is located in the first candidate target index data and a location in which the first candidate index is located in the row are the same as a row in which the first index is located in the first index data and a location in which the first index is located in the row in operation (1.1). Therefore, by updating the first candidate index, the first candidate index may be enabled to point to the data to which the first index points, that is, the index of the vertex of the target three-dimensional model is enabled to point to the data of the vertex of the original three-dimensional model. As such, a function of refreshing the first candidate target index data can be achieved. In addition, after the first candidate index is updated to an index that identifies the first location, the updated first candidate index may be used as the first target index in the foregoing, and by analogy, a first candidate target index that includes each first candidate index, that is, the updated first candidate target index data is used as the first target index data.

For example, referring to FIG. 10, it is assumed that the first row of indexes in the first index data are f 1 2 3. For the third index "3" in the row of indexes, the first location of the data in the target vertex data may be obtained based on the data v 3.75161 −9.23498 3.01049 pointed to by 3 to obtain the fourth row, and the third index in the first row of indexes in the first candidate target index data is updated from "3" to "4".

In an embodiment, it may be determined whether the first candidate index is an index that identifies the first location. When the first candidate index is not an index that identifies the first location, the first candidate index is updated to an index that identifies the first location. When the first candidate index is an index that identifies the first location, the first candidate index does not need to be updated. For example, referring to FIG. 10, it is assumed that the first row of indexes in the first index data are f 1 2 3. For the second index "2" in this row of indexes, based on data v 1.94055 −9.51756 3.4141 pointed to by 2, a first location of the data in the target vertex data may be obtained, to obtain the second row. Because 2 is already an index that identifies the second row, 2 does not need to be updated. By analogy, the first row of indexes in the first index data may be updated to f 1 2 4.

In an embodiment, a process of updating the first candidate target index data may include the following operations (2.1) and (2.2).

Operation (2.1): For any second index in the second index data, obtain, based on the data pointed to by the second index, a second location of the data in the target vertex data.

The second location is a location of any data in the second vertex data in the target vertex data, and the second index may be used to identify the second location. If each piece of data in the target vertex data occupies one row, obtaining the second location of the data of the second vertex data in the target vertex data may mean obtaining a row in which the data in the second vertex data is located in the target vertex data. In addition, if the target vertex data is stored in the first target array, obtaining the second location of the data in the target vertex data may mean obtaining a location of the data in the first target array, for example, obtaining an array subscript of the data in the first target array.

Operation (2.2): Update a first candidate index corresponding to the second index in the first candidate target index data to an index that identifies the second location.

A row in which the first candidate index is located in the first candidate target index data and a location in which the first candidate index is located in the row are the same as a row in which the second index is located in the second index data and a location in which the second index is located in the row in operation (2.1). Therefore, by updating the first candidate index, the first candidate index may be enabled to point to the data to which the second index points, that is, the index of the vertex of the target three-dimensional model is enabled to point to the data of the vertex of the three-dimensional watermark. As such, a function of refreshing the first candidate target index data can be achieved. In addition, after the first candidate index is updated to an index that identifies the second location, the updated second candidate index may be used as the first target index in the foregoing, and by analogy, a first candidate target index that includes each first candidate index, that is, the updated first candidate target index data is used as the first target index data.

In an embodiment, it may be determined whether the first candidate index is an index that identifies the second location. When the first candidate index is not an index that identifies the second location, the first candidate index is updated to an index that identifies the second location. When the first candidate index is an index that identifies the second location, the first candidate index does not need to be updated.

In an embodiment, operation (1.1) and operation (1.2) or operation (2.1) and operation (2.2) in operation 203 may be performed, or operation (1.1) and operation (1.2) and operation (2.1) and operation (2.2) in operation 203 may be performed. This is not limited in this embodiment.

Figure 11:
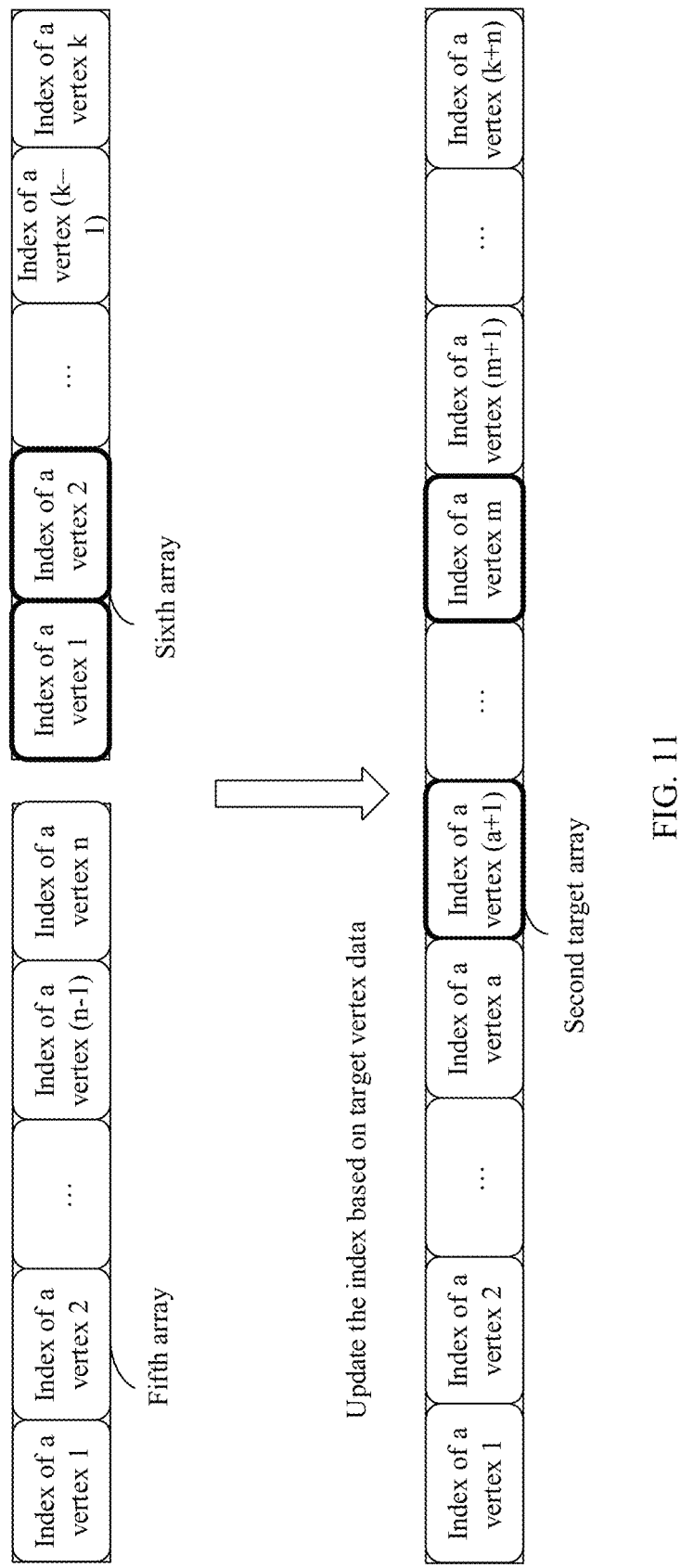
FIG. 11 is a schematic diagram of updating an index of vertex data according to an embodiment of this application.

In conclusion, referring to FIG. 11, after the target vertex data is generated, an index, (first target index) of data of each vertex in the target vertex data, in the target vertex data may be one-to-one mapped to the second target array, so that the second target array stores an index of each vertex in the target three-dimensional model.

204. The terminal combines first material data of the original three-dimensional model and second material data of the three-dimensional watermark to obtain target material data.

The first material data is material data of the original three-dimensional model. A material refers to an attribute used to determine one or more planes of the original three-dimensional model. The material may determine a feature of a plane during coloring, such as a color, a brightness degree, spontaneous luminosity, and opacity.

Figure 3:
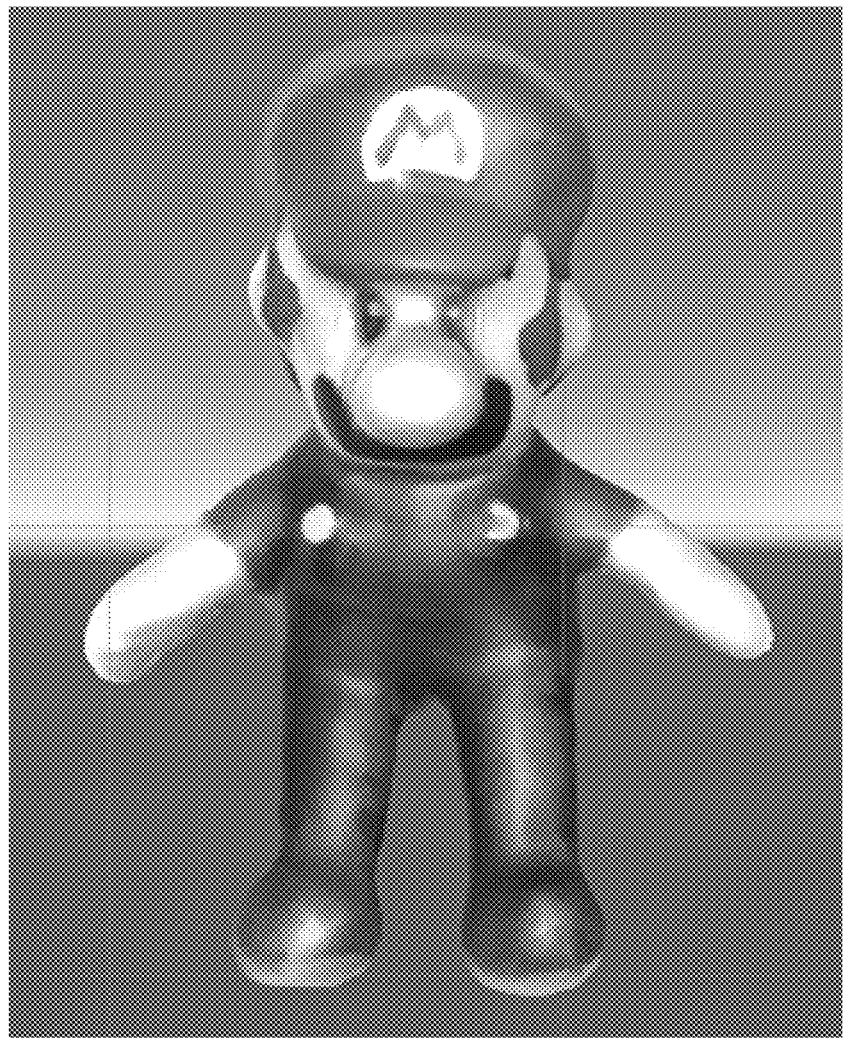
FIG. 3 is a schematic diagram of an original three-dimensional model according to an embodiment of this application.

In an embodiment, the first material data may include a first map and first texture data. The first map is a map of the original three-dimensional model, that is, an image that is pasted on each plane of the original three-dimensional model when the original three-dimensional model is drawn. For example, referring to FIG. 3 and FIG. 12, it is assumed that the original three-dimensional model is shown in FIG. 3, and the first map of the original three-dimensional model may be shown in FIG. 12. The first texture data is texture data of the original three-dimensional model. The first texture data may include texture coordinates of at least one vertex of the original three-dimensional model. The texture coordinates are also referred to as map coordinates, and the texture coordinates are used to indicate a texture pixel used when a corresponding vertex is drawn. Specifically, when any vertex in the three-dimensional model is drawn, a texture pixel corresponding to texture coordinates of the vertex is found in the map based on the texture coordinates, and the texture pixel is used to draw the vertex on a screen. The texture coordinates may include at least one dimension, for example, may include one dimension to four dimensions. For example, a data format of the texture coordinates may be (x, y). In an embodiment, a value range of the x coordinate and the y coordinate in the texture coordinates may belong to [0, 1].

In an embodiment, referring to FIG. 13, the texture coordinates in the first texture data may be arranged in rows, and each row in the first texture data is one texture coordinate. In an embodiment, each vertex may be located on a plurality of planes at the same time, and each vertex may have a plurality of texture coordinates. Correspondingly, texture coordinates of each vertex in the first texture data may occupy a plurality of rows, and each row includes texture coordinates of the vertex on a plane, and certainly may further include annotation content or other content. For example, for a cube, any vertex is located on three planes at the same time, and the vertex has three texture coordinates in the first texture data.

In an embodiment, if the original three-dimensional model is encapsulated in a file, a process of obtaining the first material data may include: parsing the file of the original three-dimensional model to obtain the first material data in the file. Specifically, for example, the original three-dimensional model includes a file in the obj format. In the file in the obj format, a row header vt is usually used to identify texture data, and a process of obtaining the first texture data may include: determining each row of data that is in the file in the obj format of the original three-dimensional model and whose row header is vt, and using obtained at least one row of data as the first texture data.

The texture coordinates in the material data are used as an example. In an example, it is assumed that the original three-dimensional model includes a vertex a1, a vertex b1, and a vertex c1. Referring to FIG. 13, the first material data may include nine rows of data, the first row of data to the third row of data are texture coordinates of the vertex a1, the fourth row of data to the sixth row of data are texture coordinates of the vertex b1, and the seventh row of data to the ninth row of data are texture coordinates of the vertex c1. In FIG. 13, the first row of data is vt 0.488327 0.72009, indicating that the texture coordinates of the vertex a1 on the first plane are (0.488327, 0.72009), and texture coordinates of another vertex are similar to those in this example.

In an embodiment, the first material data may be stored in an array. Specifically, for example, an array for storing the first material data is referred to as a third array. The third array may include at least one location, and any data of the first material data may be stored at any location of the third array. Specifically, each texture coordinate in the first material data may be stored at each location of the third array. When the original three-dimensional model is obtained, the third array may be cached in a memory, and the third array may occupy continuous memory space. For example, the third array may be shown in FIG. 14. Texture coordinates of a vertex 1 may be recorded as tex(1) in a program, and the texture coordinates of the vertex 1 may be stored at the first location of the third array. Texture coordinates of a vertex 2 may be recorded as tex(2) in the program, and the texture coordinates of the vertex 2 may be stored at the second location of the third array, and so on, where tex is an abbreviation of texture (texture). Certainly, the first material data may alternatively be stored in a storage structure other than the array, such as a hash table, a linked table, a red-black tree, or another storage structure. This is not limited in this embodiment.

The second material data is material data of the three-dimensional watermark. The second material data may include a second map and second texture data. The second map is a map of the three-dimensional watermark, that is, an image that is pasted on each plane of the three-dimensional watermark when the three-dimensional watermark is drawn. For example, referring to FIG. 4 and FIG. 15, it is assumed that the three-dimensional watermark is shown in FIG. 4, and the second map may be shown in FIG. 15. The second texture data is texture data of the three-dimensional watermark. The second texture data may include texture coordinates of at least one vertex of the three-dimensional watermark.

In an embodiment, the texture coordinates in the second texture data may be arranged in rows, and each row in the second texture data is one texture coordinate. In an embodiment, each vertex may be located on a plurality of planes at the same time, and each vertex may have a plurality of texture coordinates. Correspondingly, texture coordinates of each vertex in the second texture data may occupy a plurality of rows, and each row includes texture coordinates of the vertex on a plane, and certainly may further include annotation content or other content.

In an embodiment, if the three-dimensional watermark is encapsulated in a file, a process of obtaining the second material data may include: parsing the file of the three-dimensional watermark to obtain the second material data in the file. Specifically, for example, the three-dimensional watermark includes a file in the obj format, and a process of obtaining the second texture data may include: determining each row of data that is in the file in the obj format of the three-dimensional watermark and whose row header is vt, and using obtained at least one row of data as the second texture data.

In an embodiment, the second material data may be stored in an array. Specifically, for example, an array for storing the second material data is referred to as a fourth array. The fourth array may include at least one location, and any data of the second material data may be stored at any location of the fourth array. Specifically, each texture coordinate in the second material data may be stored at each location of the fourth array. When the original three-dimensional model is obtained, the fourth array may be cached in a memory, and the fourth array may occupy continuous memory space. Certainly, the second material data may alternatively be stored in a storage structure other than the array, such as a hash table, a linked table, a red-black tree, or another storage structure. This is not limited in this embodiment.

Figure 12:
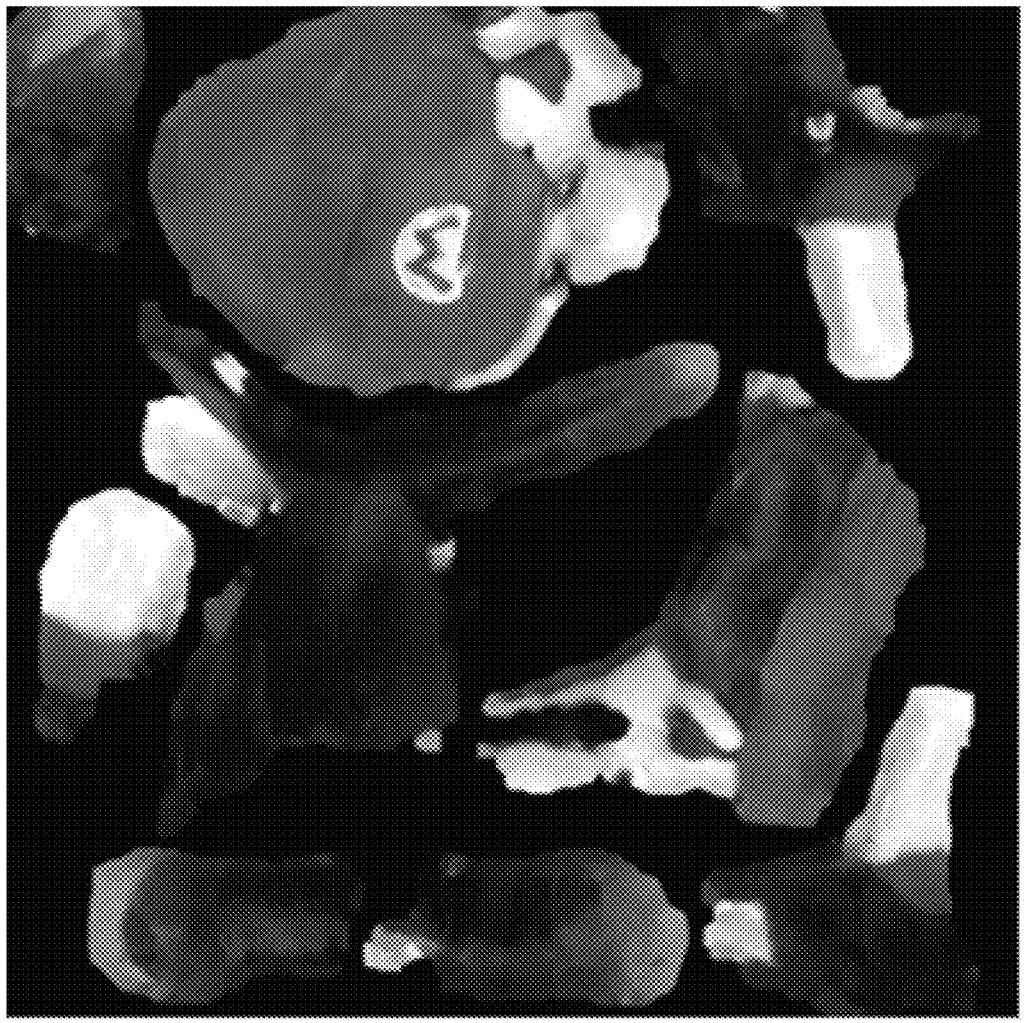
FIG. 12 is a schematic diagram of a map of an original three-dimensional model according to an embodiment of this application.

The target material data is material data of the target three-dimensional model. The target material data includes the first material data and the second material data. Specifically, the target material data includes a target map and target texture data. The target map may include the first map and the second map. For example, referring to FIG. 12, FIG. 15, and FIG. 16, it is assumed that the first map is shown in FIG. 12, and the second map is shown in FIG. 15. Then, the target map may be shown in FIG. 16. The target texture data may include the first texture data and the second texture data. In an embodiment, if the first texture data and the second texture data are updated in a watermark embedding process, the target texture data may include the updated first texture data and the updated second texture data.

In an embodiment, the target material data may be stored in an array. Specifically, for example, an array for storing the target material data is referred to as a third target array. The third target array may include at least one location, and any data of the target material data may be stored at any location of the third target array. Specifically, each texture coordinate in the target material data may be stored at each location of the third target array. When the target material data is obtained by combining, the third target array may be generated, and the target material data is stored in the third target array. The third target array may be cached in a memory, and the third target array may occupy continuous memory space. The third target array may store data stored at each location in the third array and data stored at each location in the fourth array, so as to store each piece of material data of the original three-dimensional model and each piece of material data of the three-dimensional watermark, for example, store each updated texture coordinate of the original three-dimensional model and each updated texture coordinate of the three-dimensional watermark.

The target material data includes the material data of the original three-dimensional model and the material data of the three-dimensional watermark. When the target three-dimensional model is subsequently generated based on the target material data, the target three-dimensional model includes the material of the original three-dimensional model and the material of the three-dimensional watermark, for example, includes the texture of the original three-dimensional model and the texture of the three-dimensional watermark. Therefore, it can be ensured that both the material of the original three-dimensional model and the material of the three-dimensional watermark can be completely displayed. This avoids an appearance loss to the material of the original three-dimensional model and the material of the three-dimensional watermark.

In an embodiment, a process of combining the material data may include the following operations 1 to 3:

Operation 1: Splice the first map of the original three-dimensional model and the second map of the three-dimensional watermark to obtain the target map.

The target map includes both the map of the original three-dimensional model and the map of the three-dimensional watermark. Therefore, when the target three-dimensional model is subsequently generated based on the target map, it can be ensured that the target three-dimensional model is completely displayed.

Figure 16:
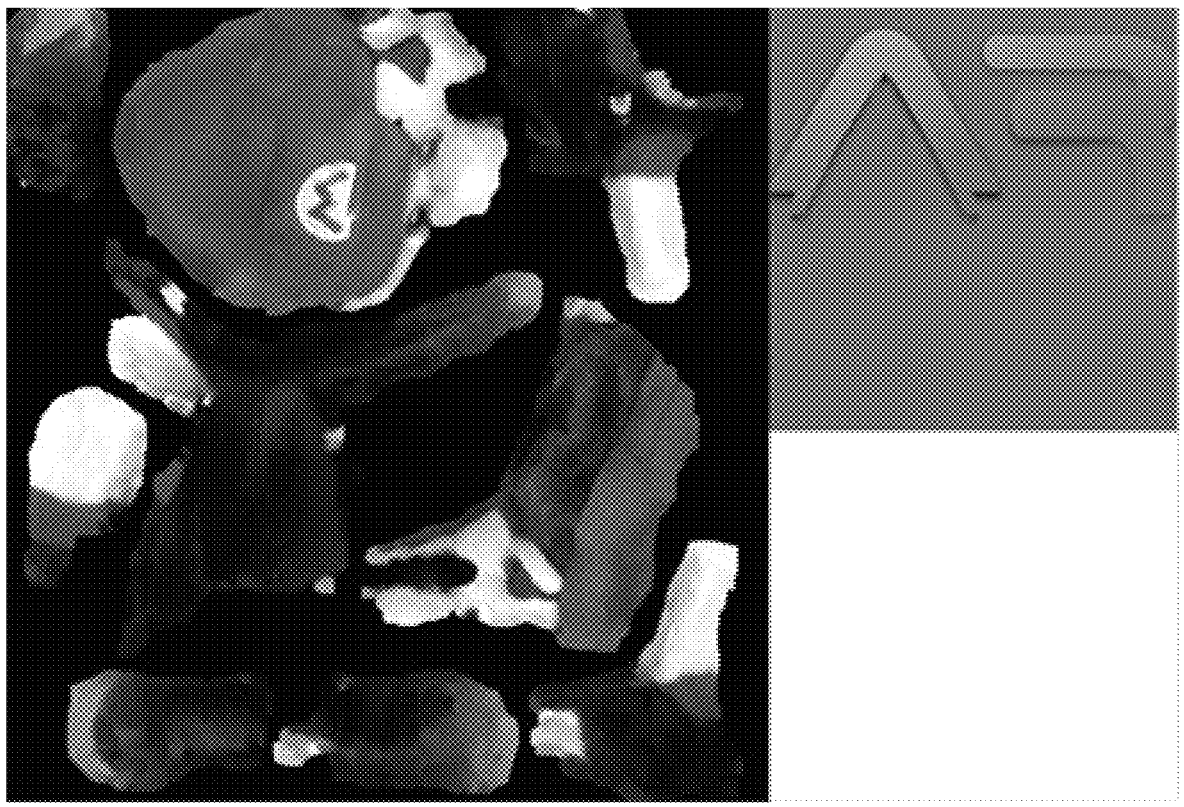
FIG. 16 is a schematic diagram of a map of a target three-dimensional model according to an embodiment of this application.

For a manner of splicing the first map and the second map, in an embodiment, as shown in FIG. 16, the first map and the second map may be horizontally spliced to obtain the target map. For example, the second map may be disposed on a left side of the first map, and then the first map and the second map are combined, and the combined map is used as the target map. Then, a length of the target map may be determined based on a sum of a length of the first map and a length of the second map, and a width of the target map may be determined based on the larger one of a width of the first map and a width of the second map. For example, it is assumed that a size of the first map is 256*256 and a size of the second map is 128*128. After the first map and the second map are spliced, a size of the target map may be (256+128)*256, where * indicates multiplication.

In an embodiment, horizontally splicing the first map and the second map may be merely an optional manner of splicing the first map and the second map, not a mandatory manner. Optionally, the first map and the second map may be spliced in a manner other than horizontal splicing. For example, the first map and the second map may be vertically spliced to obtain the target map.

Operation 2: Update the first texture data of the original three-dimensional model and the second texture data of the three-dimensional watermark based on the target map.

Texture mapping (English: texture mapping) may be performed based on the target map and the first texture data, to obtain updated first texture data. In a possible implementation, the target map may be mapped to texture space. For each texture coordinate in the first texture data, a pixel of the first map to which the texture coordinate is mapped may be obtained based on the texture coordinate and the first map, and an updated texture coordinate corresponding to the pixel may be obtained based on the target map and a correspondence between the pixel of the first map and a pixel of the target map, so as to update the texture coordinate.

In addition, texture mapping may be performed based on the target map and the second texture data to obtain updated second texture data. A process of updating the second texture data is the same as a process of updating the first texture data, and details are not described herein again.

Operation 3: Combine the updated first texture data and the updated second texture data to obtain the target texture data, where the target texture data includes the updated first texture data and the updated second texture data.

For a manner of combining the first material data and the second material data, optionally, the terminal may insert the second material data of the three-dimensional watermark into the first material data of the original three-dimensional model to obtain the target material data. Correspondingly, the target material data is the first material data into which the second material data is inserted. For example, the material data is the texture data. The terminal may insert the second texture data of the three-dimensional watermark into the first texture data of the original three-dimensional model to obtain the target texture data. Correspondingly, the target texture data is the first texture data into which the second texture data is inserted.

In an embodiment, any material data in the second material data may be inserted between different data in the first material data. If each piece of material data in the first material data is arranged in rows, inserting material data between different data in the first material data may include: inserting the data as a newly added row in the first material data between any two rows in the first material data. If each piece of data in the first material data is stored in the third array, inserting data between different data in the first material data may include: selecting two adjacent locations from the third array of the original three-dimensional model; and inserting material data of the three-dimensional watermark between the two adjacent locations of the third array.

For a manner of obtaining any data in the second material data, if the second material data is stored in an array, and it is assumed that an array for storing the second material data is referred to as a fourth array, any data in the second material data may be read from any location in the fourth array, for example, a location in the array is queried by using an array subscript, and then data is read from the location. Certainly, the second material data may alternatively be stored in a storage structure other than the array, and any data in the second material data may be read from the storage structure other than the array.

Figure 17:
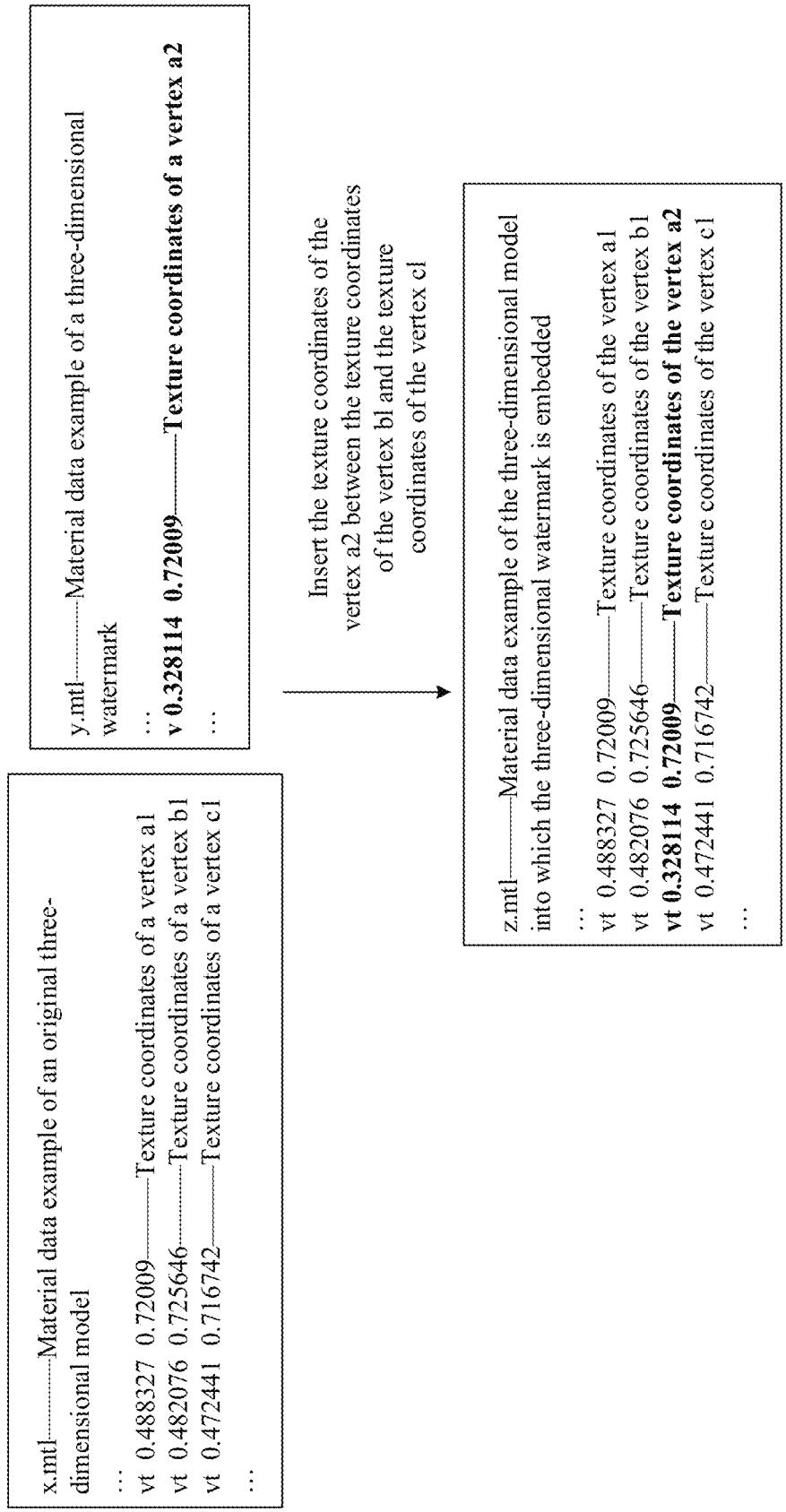
FIG. 17 is a schematic diagram of inserting second material data into first material data according to an embodiment of this application.

For example, referring to FIG. 17, it is assumed that the first material data of the original three-dimensional model includes three rows of data, the first row of data is texture coordinates of a vertex a1, the second row of data is texture coordinates of a vertex b1, and the third row of data is texture coordinates of a vertex c1. The first row of data in the second material data of the three-dimensional watermark, such as texture coordinates of a vertex a2, may be inserted between the second row of data and the third row of data of the first material data. Therefore, in the target material data obtained after insertion, the third row of data is the texture coordinates of the vertex a2, and the fourth row of data is the texture coordinates of the vertex c1. By analogy, it is assumed that the first material data includes n rows of data, and the second material data includes m rows of data. After the second material data is inserted into the first material data, the first material data may include m+n rows of data, where m and n are positive integers.

In an embodiment, inserting the second material data into the first material data may mean inserting the second material data into the first material data of the original three-dimensional model, or may mean generating a copy of the first material data, and inserting the second material data into the copy of the first material data. This is not limited in this embodiment. In addition, inserting the second material data into the first material data may mean that after the first texture data and the second texture data are updated based on the target map, the updated second texture data is inserted into the updated first texture data to obtain the target texture data. This is not limited in this embodiment.

In an embodiment, the material data may be inserted randomly, and the second material data of the three-dimensional watermark may be randomly inserted into the first material data of the original three-dimensional model to obtain the target material data. Therefore, the target material data is the first material data into which the second material data is randomly inserted. Specifically, any data in the second material data may be randomly inserted between different data in the first material data. If each piece of data in the first material data is arranged in rows, inserting data between different data in the first material data may include: randomly inserting the data as a newly added row in the first material data between any two rows in the first material data. If each piece of data in the first material data is stored in the third array, inserting data between different data in the first material data may specifically include the following operations 1 to 3:

Operation 1: Randomly select two adjacent locations from the third array of the original three-dimensional model.

Two adjacent locations may be selected from all locations of the third array in any random selection manner, which is not limited in this embodiment.

Operation 2: Read any data in the second material data from the fourth array of the three-dimensional watermark.

Data may be read from the fourth array based on any preset policy, which is not limited in this embodiment. The read data may be texture coordinates.

For example, each piece of material data of the three-dimensional watermark may be successively read from the fourth array in a sequence of locations in the fourth array. For example, data of the first location in the fourth array is read first, and then data of the second location is read until data of the last location is read. In a mathematical manner, it is assumed that the fourth array includes material data of a vertex 1 to material data of a vertex n, that is, tex(1) to tex(n), data of tex(1) may be read first, and then data of tex(2) is read until data of tex(n) is read.

Operation 3: Insert the data between the two adjacent locations of the third array.

Figure 18:
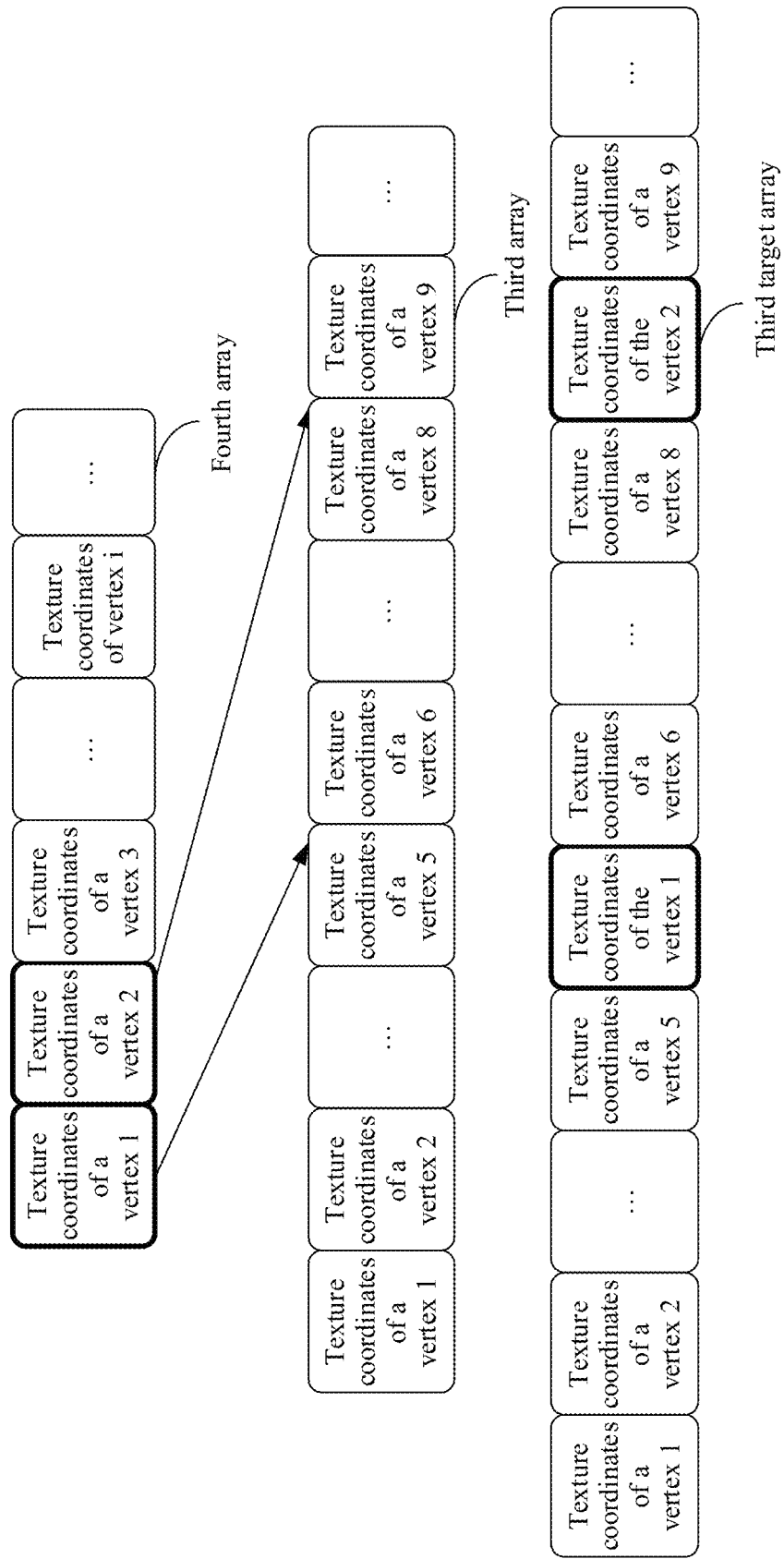
FIG. 18 is a schematic diagram of inserting second material data into first material data according to an embodiment of this application.

A new location may be added between the two adjacent locations, and the data is inserted into the new location. For example, referring to FIG. 18, the fifth location and the sixth location may be randomly selected from the third array of the original three-dimensional model, texture data of a vertex 1 is read from the fourth array of the three-dimensional watermark, that is, tex(1), and tex(1) is inserted between the fifth location and the sixth location. Similarly, the eighth location and the ninth location may be randomly selected from the third array of the original three-dimensional model, texture data of a vertex 2 is read from the fourth array of the three-dimensional watermark, that is, tex(2), and tex(2) is inserted between the eighth location and the ninth location.

Effects achieved by randomly inserting the material data of the three-dimensional watermark may include at least the following:

First, by inserting the data in the fourth array of the three-dimensional watermark into the third array of the original three-dimensional model, a function of combining the third array and the fourth array can be achieved, that is, a function of combining the first material data and the second material data is achieved. For example, the third array after the data is inserted is referred to as a third target array. Because the third target array stores both the material data of the original three-dimensional model and the material data of the three-dimensional watermark, when the target three-dimensional model is subsequently displayed based on the third target array, both the material of the original three-dimensional model and the material of the three-dimensional watermark can be displayed. This presents a display effect of the original three-dimensional model into which the three-dimensional watermark is embedded.

Second, a location of each piece of material data in the three-dimensional watermark is random in the target material data. For example, material data of a vertex a2 is located in the second row, material data of a vertex b2 is located in the tenth row, and material data of a vertex c2 is located in the eighth row. Therefore, the three-dimensional watermark cannot be easily removed or modified in the target three-dimensional model. Third, once the three-dimensional watermark fails to be removed or modified in the target three-dimensional model, different material data in the target three-dimensional model is misplaced, and material data of the target three-dimensional model is disordered. Therefore, the three-dimensional watermark can be prevented from being removed or modified in the target three-dimensional model. In conclusion, a function of encrypting the embedded three-dimensional watermark can be implemented, and the copyright of the original three-dimensional model can be effectively ensured. This better promote a digital asset such as the three-dimensional model.

In an embodiment, the material data may be inserted dispersedly, and the second material data of the three-dimensional watermark may be dispersedly inserted into the first material data of the original three-dimensional model to obtain the target material data. Specifically, different data in the second material data may be inserted at different locations in the first material data, so that a plurality of pieces of data in the second material data are not adjacent to each other as far as possible in the first material data.

It should be noted that, random insertion may be an optional manner of inserting the second material data of the watermark model, not a mandatory manner. In an embodiment, the second material data of the watermark model may be inserted in a manner other than random insertion. For example, each piece of data in the fourth array is successively inserted between every two adjacent locations in the third array, for example, between the first location and the second location in the third array, and between the second location and the third location in the third array, until the data is inserted at an end location. Certainly, the second material data may alternatively be inserted in another manner, which is not limited in this embodiment.

It should be further noted that, inserting the second material data of the watermark model may be only an optional manner of combining the material data of the two three-dimensional models, not a mandatory manner. In an embodiment, the material data of the two three-dimensional models may be combined in a manner other than the manner of inserting the second material data. For example, the second material data of the three-dimensional watermark and the first material data of the original three-dimensional model may be sorted and combined based on any preset policy to obtain the target material data. The first material data and the second material data may be sequentially concatenated into the target material data. For another example, each piece of data in the fourth array may be successively inserted between every two adjacent locations in a sequence from the first location to the last location in the third array. Certainly, the second material data may alternatively be inserted in another manner. This is not limited in this embodiment.

205. The terminal generates second target index data corresponding to the target material data based on the target material data, third index data corresponding to the first material data, and fourth index data corresponding to the second material data.

The third index data is used to query corresponding material data in the original three-dimensional model. Specifically, the first material data may include at least one piece of material data of the original three-dimensional model. Correspondingly, the third index data may include an index of at least one piece of material data of the original three-dimensional model. For example, any index in the third index data is referred to as a third index. Each third index may be in a one-to-one correspondence with each piece of material data in the first material data. Any third index is used to query material data corresponding to the third index. For example, the third index may be used to query corresponding texture data in the original three-dimensional model. Specifically, the third index may be used to query texture coordinates of any vertex of the original three-dimensional model. In an embodiment, if each piece of material data in the first material data occupies one row, correspondingly, each third index may be a row identifier. The row identifier is used to identify a row in which corresponding material data is located, and may be a row number.

It should be noted that the first index data and the third index data may be carried in a same file. Further, indexes corresponding to a same vertex in the first index data and the third index data may be located at a same location of the file. The first index and the third index may be separated by a preset symbol. The preset symbol may be "/", or certainly may be another symbol in a programming language. For example, in the obj file of the original three-dimensional model, an index of vertex data of any vertex and an index of material data of the vertex may be located at a same location, for example, both are located at a jth location of an ith row, where a value on a left side of "I" at the location represents the index of the vertex data of the vertex, and a value on a right side of "I" represents the index of the material data of the vertex.

For example, it is assumed that plane indexes of the first row in the obj file are f 1/2 2/1 3/3. It may be learned that an index corresponding to the first vertex on the first triangular plane is "1/2", an index corresponding to the second vertex on the first triangular plane is "2/1", and an index corresponding to the third vertex on the first triangular plane is "3/3". "1/2" indicates that an index of vertex data of the first vertex on the first triangular plane is 1, and an index of material data of the first vertex on the first triangular plane is 2.

In an embodiment, if the original three-dimensional model is encapsulated in a file, a process of obtaining the first material data may include: parsing the file of the original three-dimensional model to obtain the first material data in the file.

In an embodiment, the third index data may be stored in an array. Specifically, for example, an array for storing the third index data is referred to as a seventh array. The seventh array may include at least one location, and any third index may be stored at any location of the seventh array. When the original three-dimensional model is obtained, the seventh array may be cached in a memory, and the seventh array may occupy continuous memory space. Certainly, the third index data may alternatively be stored in a storage structure other than the array, such as a hash table, a linked table, a red-black tree, or another storage structure. This is not limited in this embodiment.

The fourth index data is used to query corresponding material data in the three-dimensional watermark. Specifically, the second material data may include at least one piece of material data of the three-dimensional watermark. Correspondingly, the fourth index data may include an index of at least one piece of material data of the three-dimensional watermark. For example, any index in the fourth index data is referred to as a fourth index. Each fourth index may be in a one-to-one correspondence with each piece of material data in the second material data. Any fourth index is used to query material data corresponding to the fourth index. For example, the fourth index is used to query corresponding texture data in the three-dimensional watermark. Specifically, the fourth index may be used to query corresponding texture coordinates in the three-dimensional watermark. In an embodiment, if each piece of material data in the second material data occupies one row, correspondingly, each fourth index may be a row identifier. The row identifier is used to identify a row in which corresponding material data is located, and may be a row number. In an embodiment, if the three-dimensional watermark is encapsulated in a file, a process of obtaining the second material data may include: parsing the file of the three-dimensional watermark to obtain the second material data in the file.

In an embodiment, the fourth index data may be stored in an array. Specifically, for example, an array for storing the fourth index data is referred to as an eighth array. The eighth array may include at least one location, and any fourth index may be stored at any location of the eighth array. When the three-dimensional watermark is obtained, the eighth array may be cached in a memory, and the eighth array may occupy continuous memory space. Certainly, the fourth index data may alternatively be stored in a storage structure other than the array, such as a hash table, a linked table, a red-black tree, or another storage structure. This is not limited in this embodiment.

The second target index data is used to query corresponding material data in the target three-dimensional model. The target material data may include at least one piece of material data of the target three-dimensional model. Correspondingly, the second target index data may include an index of at least one piece of material data of the target three-dimensional model. Each index in the second target index data and each piece of material data in the target material data are in a one-to-one correspondence. Any index is used to query material data corresponding to the index, for example, query texture data corresponding to the index. Specifically, the index may be used to query texture coordinates corresponding to the index. In an embodiment, if each piece of data in the target material data occupies one row, correspondingly, each index in the second target index data may be a row identifier. The row identifier is used to identify a row in which corresponding data is located, and may be a row number.

In an embodiment, the second target index data may be stored in an array. Specifically, for example, an array for storing the second target index data is referred to as a fourth target array. The fourth target array may include at least one location, and any index in the second target index data may be stored at any location of the fourth target array. The fourth target array may be obtained by combining the seventh array and the eighth array. For example, the seventh array into which the index of the eighth array is inserted may be used as the fourth target array. The fourth target array may occupy continuous memory space. Certainly, the second target index data may alternatively be stored in a storage structure other than the array, such as a hash table, a linked table, a red-black tree, or another storage structure. This is not limited in this embodiment.

For example, any index in the second target index data is referred to as a second target index, and data pointed to by the second target index may include any one of the following cases (1) and (2):

Case (1): The data pointed to by the second target index is the same as the data pointed to by the corresponding third index.

The third index is any index in the third index data. The data pointed to by the third index may be data in the first material data, and may be specifically texture data, for example, texture coordinates of the original three-dimensional model. For a correspondence between the second target index and the third index, that any second target index corresponds to any third index may mean that a location of the second target index in the second target index data is the same as a location of the third index in the third index data. Specifically, if the index data is arranged in rows, and each row includes a plurality of indexes, that the second target index corresponds to the third index may mean that a row in which the second target index is located in the second target index data and a location in which the second target index is located in the row are the same as a row in which the third index is located in the third index data and a location in which the third index is located in the row. In addition, if the index data is stored in an array, that the second target index corresponds to the third index may mean that a location of the second target index in the fourth target array is the same as a location of the third index in the seventh array. For example, an array subscript of the second target index in the fourth target array is the same as an array subscript of the third index in the seventh array.

For example, it is assumed that the second target index data is f 1 2 4, where 1 points to the first row of data vt 0.488327 0.72009 in the target material data, 2 points to the second row of data vt 0.482076 0.725646 in the target material data, and 4 points to the fourth row of data vt 0.480363 0.706376 in the target material data. The third index data is f 1 2 3, where 1 points to the first row of data vt 0.488327 0.72009 of the first material data, 2 points to the second row of data vt 0.482076 0.725646 of the first material data, and 3 points to the third row of data vt 0.480363 0.706376 of the first material data. Therefore, 1 in the second target index data corresponds to 1 in the third index data, 2 in the second target index data corresponds to 2 in the third index data, and 4 in the second target index data corresponds to 3 in the third index data.

Effects achieved in case (1) may include at least the following:

Because the data pointed to by the second target index in the second target index data is the same as the data pointed to by the corresponding third index in the third index data, data found by using the second target index is the same as data found by using the third index. Based on implementation of the function of embedding the three-dimensional watermark, the material data of the original three-dimensional model is prevented from being modified in the generated target three-dimensional model. In this case, material data of vertices in the target three-dimensional model can be consistent with material data of vertices in the original three-dimensional model, and an appearance of the original three-dimensional model in the target three-dimensional model can be consistent with that of the original three-dimensional model. This avoids affecting a visual effect of the original three-dimensional model and prevents watermark embedding from destroying the original use value of the original three-dimensional model.

Case (2): The data pointed to by the second target index is the same as the data pointed to by the fourth index.

The fourth index is any index in the fourth index data. The data pointed to by the fourth index may be data in the second material data, and may be specifically texture data, for example, texture coordinates of the three-dimensional watermark.

For a correspondence between the second target index and the fourth index, that any second target index corresponds to any fourth index may mean that a location of the second target index in the second target index data is the same as a location of the fourth index in the fourth index data. Specifically, if the index data is arranged in rows, and each row includes a plurality of indexes, that the second target index corresponds to the fourth index may mean that a row in which the second target index is located in the second target index data and a location in which the second target index is located in the row are the same as a row in which the fourth index is located in the fourth index data and a location in which the fourth index is located in the row. In addition, if the index data is stored in an array, that the second target index corresponds to the fourth index may mean that a location of the second target index in the fourth target array is the same as a location of the fourth index in the eighth array. For example, an array subscript of the second target index in the fourth target array is the same as an array subscript of the fourth index in the eighth array.

For example, it is assumed that the second target index data is f 1 2 4, where 1 points to the first row of data vt 0.488327 0.72009 in the target material data, 2 points to the second row of data vt 0.482076 0.725646 in the target material data, and 4 points to the fourth row of data vt 0.480363 0.706376 in the target material data. The fourth index data is f 1 2 3, where 1 points to the first row of data vt 0.488327 0.72009 of the second material data, 2 points to the second row of data vt 0.482076 0.725646 of the second material data, and 3 points to the third row of data vt 0.480363 0.706376 of the second material data. Therefore, 1 in the second target index data corresponds to 1 in the fourth index data, 2 in the second target index data corresponds to 2 in the fourth index data, and 4 in the second target index data corresponds to 3 in the fourth index data.

Effects achieved in case (2) may include at least the following:

Because the data pointed to by the second target index in the second target index data is the same as the data pointed to by the corresponding fourth index in the fourth index data, data found by using the second target index is the same as data found by using the corresponding fourth index, and a material of a corresponding vertex in the target three-dimensional model is the same as a material of a corresponding vertex in the three-dimensional watermark. Based on implementation of the function of embedding the three-dimensional watermark, the material data of the three-dimensional watermark is prevented from being modified in the generated target three-dimensional model. In this case, the vertex data of the target three-dimensional model can be consistent with the vertex data of the three-dimensional watermark, and an appearance of the three-dimensional watermark in the target three-dimensional model can be consistent with that of the three-dimensional watermark itself. This avoids affecting a visual effect of the three-dimensional watermark and prevents watermark embedding from destroying original use value of the three-dimensional watermark.

In an embodiment, a process of generating the second target index data may include the following operations 1 and 2:

Operation 1: Combine the third index data and the fourth index data to obtain second candidate target index data.

The second candidate target index data is data obtained after the third index data and the fourth index data are combined, and the second candidate target index data includes the third index data and the fourth index data. A manner of combining the third index data and the fourth index data may be similar to the manner of combining the first vertex data and the second vertex data. Specifically, the fourth index data may be inserted into the third index data. For example, a process of inserting any fourth index in the fourth index data may include: selecting two adjacent locations from the seventh array of the original three-dimensional model; reading any fourth index in the fourth index data from the eighth array of the three-dimensional watermark; and inserting the fourth index between the two adjacent locations of the seventh array.

Operation 2: Update the second candidate target index data based on the target material data to obtain the second target index data.

In an embodiment, a process of updating the second candidate target index data may include the following operations (1.1) and (1.2).

Operation (1.1): For any third index in the third index data, obtain, based on data pointed to by the third index, a third location of the data in the target material data.

The third location is a location of any data in the first material data in the target material data, and the third index may be used to identify the third location. If each piece of data in the target material data occupies one row, obtaining the third location of the data of the first material data in the target material data may mean obtaining a row in which the data in the first material data is located in the target material data. In addition, if the target material data is stored in the third target array, obtaining the third location of the data in the target material data may mean obtaining a location of the data in the third target array, for example, obtaining an array subscript of the data in the third target array, and using the array subscript as the third location.

Operation (1.2): Update a second candidate index corresponding to the third index in the second candidate target index data to an index that identifies the third location.

A row in which the second candidate index is located in the second candidate target index data and a location in which the second candidate index is located in the row are the same as a row in which the third index is located in the third index data and a location in which the third index is located in the row in operation (1.1). Therefore, by updating the second candidate index, the second candidate index may be enabled to point to the data to which the third index points, that is, the index of the material of the target three-dimensional model is enabled to point to the data of the material of the original three-dimensional model. As such, a function of refreshing the second candidate target index data can be achieved. In addition, after the second candidate index is updated to an index that identifies the third location, the updated second candidate index may be used as the second target index in the foregoing, and by analogy, a second candidate target index that includes each second candidate index, that is, the updated second candidate target index data is used as the second target index data.

In an embodiment, a process of updating the second candidate target index data may include the following operations (2.1) and (2.1).

Operation (2.1): For any fourth index in the fourth index data, obtain, based on data pointed to by the fourth index, a fourth location of the data in the target material data.

The fourth location is a location of any data in the second material data in the target material data, and the fourth index may be used to identify the fourth location. If each piece of data in the target material data occupies one row, obtaining the fourth location of the data of the second material data in the target material data may mean obtaining a row in which the data in the second material data is located in the target material data. In addition, if the target material data is stored in the third target array, obtaining the fourth location of the data in the target material data may mean obtaining a location of the data in the third target array, for example, obtaining an array subscript of the data in the third target array, and using the array subscript as the fourth location.

Operation (2.2): Update a second candidate index corresponding to the fourth index in the second candidate target index data to an index that identifies the fourth location.

A row in which the second candidate index is located in the second candidate target index data and a location in which the second candidate index is located in the row are the same as a row in which the fourth index is located in the fourth index data and a location in which the fourth index is located in the row in operation (1.1). Therefore, by updating the second candidate index, the second candidate index may be enabled to point to the data to which the fourth index points, that is, the index of the material of the target three-dimensional model is enabled to point to the data of the material of the three-dimensional watermark. As such, a function of refreshing the second candidate target index data can be achieved. In addition, after the second candidate index is updated to an index that identifies the fourth location, the updated second candidate index may be used as the second target index in the foregoing, and by analogy, a second candidate target index that includes each second candidate index, that is, the updated second candidate target index data is used as the second target index data.

In an embodiment, operation (1.1) and operation (1.2) or operation (2.1) and operation (2.2) in operation 204 may be performed, or operation (1.1) and operation (1.2) and operation (2.1) and operation (2.2) in operation 204 may be performed. This is not limited in this embodiment.

Figure 19:
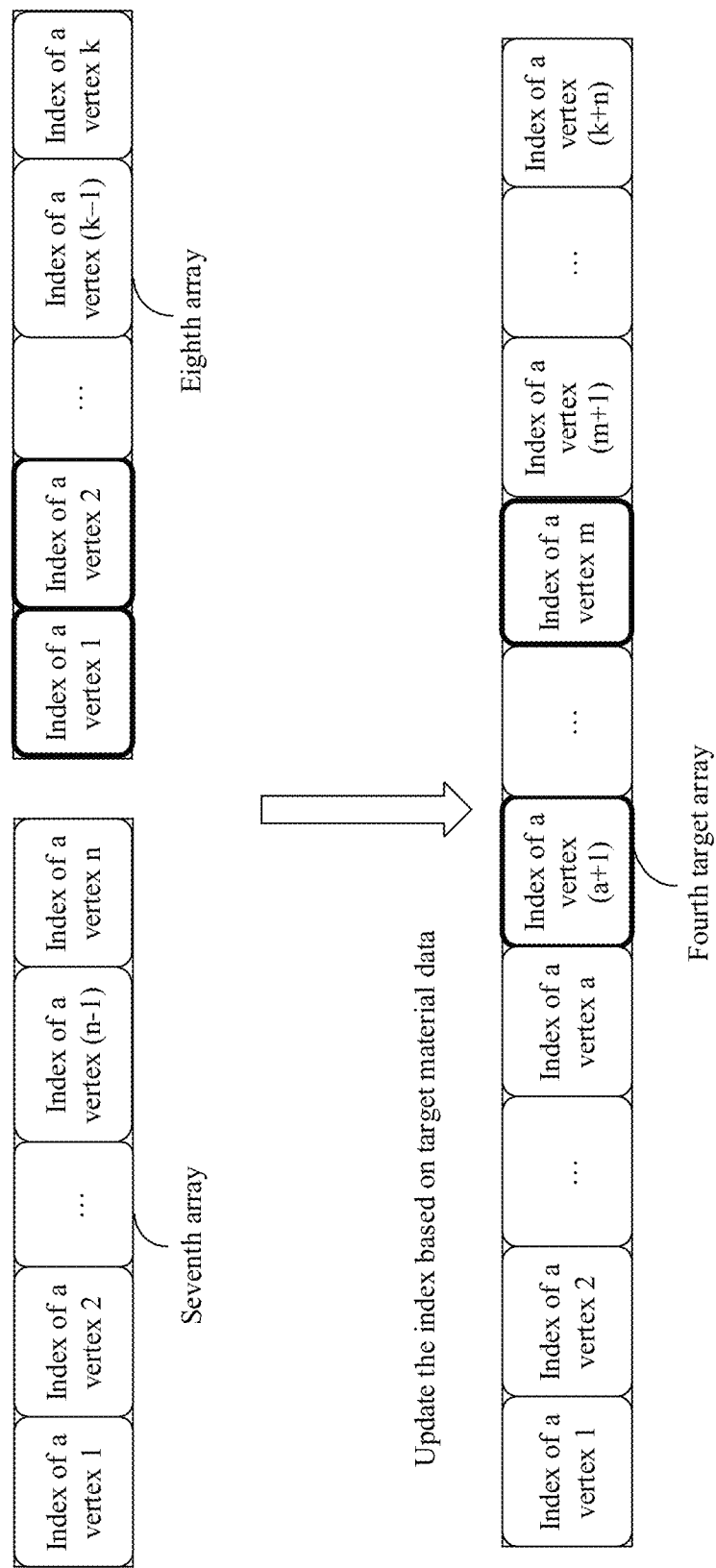
FIG. 19 is a schematic diagram of updating an index of texture data according to an embodiment of this application.

In conclusion, referring to FIG. 19, after the target material data is generated, an index (second target index), of each piece of material data in the target material data, in the target material data may be one-to-one mapped to the fourth target array, so that the fourth target array stores an index of each piece of material data in the target three-dimensional model.

It should be noted that operation 202 and operation 203 and operation 204 and operation 205 may be successively performed. For example, operation 202 and operation 203 are first performed, and then operation 204 and operation 205 are performed. In addition, operation 202 and operation 203 and operation 204 and operation 205 may be performed in parallel. For example, after operation 201 is performed, operation 202 and operation 204 are performed simultaneously, which is not limited in this embodiment.

206. The terminal generates the target three-dimensional model based on the target vertex data and the target material data, where the target three-dimensional model includes the original three-dimensional model and the three-dimensional watermark.

Figure 20:
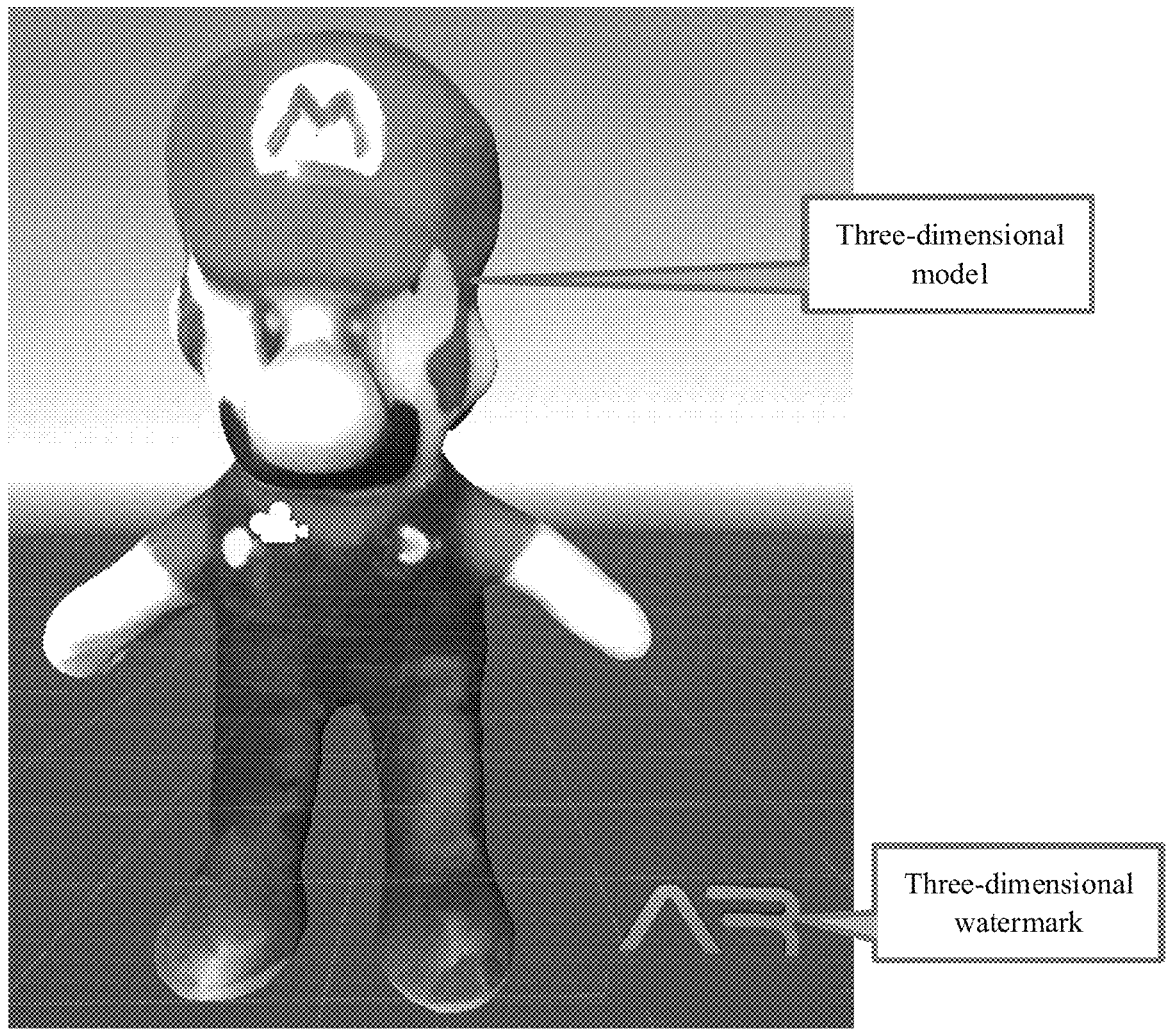
FIG. 20 is a schematic diagram of a target three-dimensional model according to an embodiment of this application.
Figure 21:
FIG. 21 is a schematic diagram of a target three-dimensional model according to an embodiment of this application.

A display effect of the target three-dimensional model may include that the original three-dimensional model is adjacent to the three-dimensional watermark. For example, the three-dimensional watermark may be located in the lower right corner of the original three-dimensional model. For example, the target three-dimensional model may be shown in FIG. 20. Further, FIG. 21 is an effect diagram of all angles of the target three-dimensional model. It can be seen from comparison between FIG. 21 and FIG. 3 that an appearance of a person model in FIG. 21 is consistent with that of the person model in FIG. 3. It can be learned that this embodiment not only implements a watermark embedding function, but also avoids impact on the appearance of the original three-dimensional model.

In an embodiment, when the target three-dimensional model is displayed, data of each vertex in the target three-dimensional model may be queried based on first target index data of the target three-dimensional model, and the target three-dimensional model is displayed based on the data of each vertex. Because the first target index data is updated, a display effect of each vertex in the target three-dimensional model can be the same as a display effect of a corresponding vertex in the original three-dimensional model, or can be the same as a display effect of a corresponding vertex in the three-dimensional watermark. In addition, material data of the target three-dimensional model can be queried based on the second target index data, so as to display the target three-dimensional model based on the material data. Because the second target index data is updated, any material of the target three-dimensional model can be the same as a corresponding material of the original three-dimensional model, or can be the same as a corresponding material of the three-dimensional watermark.

The target vertex data and the target material data may be encapsulated to obtain the target three-dimensional model. The first target index data may be used as an index of the target vertex data, and the second target index data may be used as an index of the target material data, so as to generate the target three-dimensional model. In an embodiment, the target vertex data and the target index data may be stored in a file, and the file is used as the target three-dimensional model.

In an embodiment, the target three-dimensional model may be shared, so that a sharing object can obtain the target three-dimensional model. Specifically, when a sharing instruction is received, the sharing object may be obtained based on the sharing instruction, and the target three-dimensional model is sent to the sharing object. The sharing object of the target three-dimensional model may include a microblog, an instant messaging application, a friend of a user, or another social platform. The sharing instruction may be triggered by a click operation on a sharing option, or may be triggered by a voice operation and another input operation. This is not limited in this embodiment.

In an embodiment, format conversion may be performed on the target three-dimensional model, for example, the target three-dimensional model may be converted into a binary format. For example, the target three-dimensional model may be converted from the OBJ format to a glb format. In addition, the converted target three-dimensional model may be shared. By performing format conversion on the target three-dimensional model, a data amount of the target three-dimensional model can be reduced, and a speed of sharing the target three-dimensional model can be increased.

Figure 22:
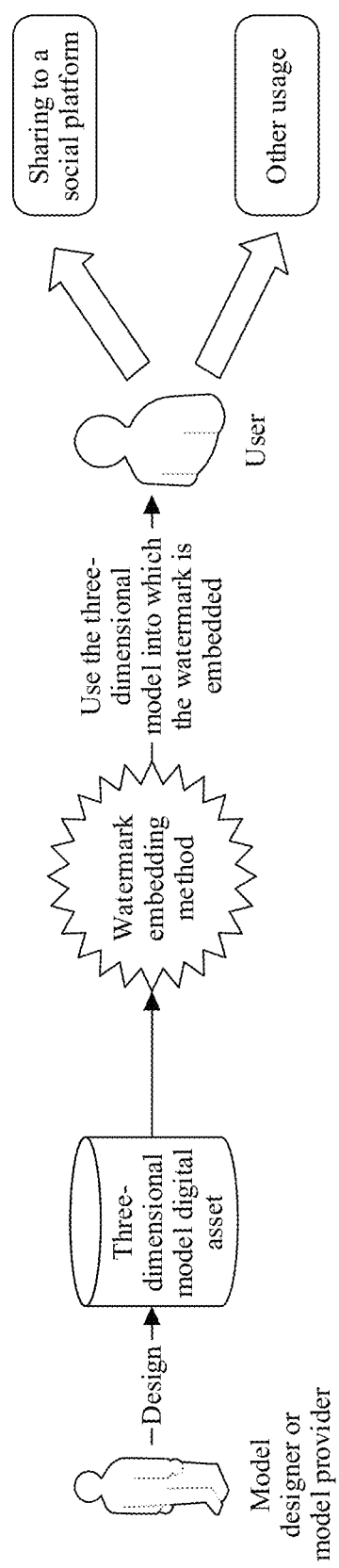
FIG. 22 is a schematic diagram of an application scenario of a watermark embedding method according to an embodiment of this application.

In an example application scenario, referring to FIG. 22, after designing a three-dimensional model, a model designer may add a three-dimensional watermark to the three-dimensional model by using the watermark embedding method provided in this embodiment, and then distribute, to a user, a target three-dimensional model to which the three-dimensional watermark is added. The user may share the target three-dimensional model to a social platform or reserve the target three-dimensional model for other usage. For the model designer, this embodiment can effectively protect the copyright of a digital asset such as the three-dimensional model. For a model user, this embodiment can declare the use copyright of the model, so that the user can feel reassured when using the model file.

This embodiment provides a watermark embedding method applicable to a 3D field. By combining the vertex data of the original three-dimensional model and the vertex data of the three-dimensional watermark, and combining the material data of the original three-dimensional model and the material data of the three-dimensional watermark, the original three-dimensional model and the three-dimensional watermark may be combined into one three-dimensional model, thereby seamlessly embedding the three-dimensional watermark into the original three-dimensional model, and effectively protecting the copyright of the three-dimensional model. Further, before and after the watermark is embedded, the appearance of the three-dimensional model can remain unchanged, so as to avoid impact of watermark embedding on the appearance of the original three-dimensional model, prevent watermark embedding form reducing the use value of the original three-dimensional model, and ensure the display effect of the three-dimensional model. Further, a function of encrypting the embedded three-dimensional watermark may be implemented, and the three-dimensional watermark cannot be easily removed or modified in the target three-dimensional model. This can effectively ensure the copyright of the original three-dimensional model, and better promote a digital asset such as the three-dimensional model.

Figure 23:
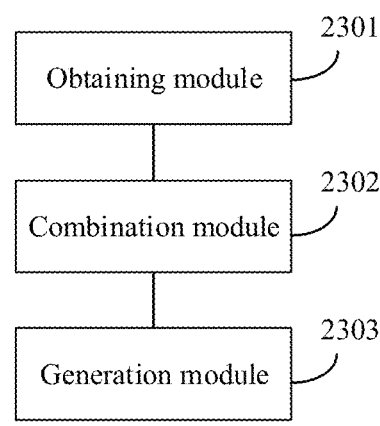
FIG. 23 is a schematic structural diagram of a watermark embedding apparatus according to an embodiment of this application.

Based on the foregoing embodiments, an embodiment provides a watermarking embedding apparatus. Referring to FIG. 23, the apparatus includes an obtaining module 2301, a combination module 2302, and a generation module 2303.

The obtaining module 2301 is configured to perform operation 201.

The combination module 2302 is configured to perform operation 202 and operation 204.

The generation module 2303 is configured to perform operation 206.

In an embodiment, the combination module 2302 is configured to insert the second vertex data of the three-dimensional watermark into the first vertex data of the original three-dimensional model.

In an embodiment, the combination module 2302 is configured to randomly insert the second vertex data of the three-dimensional watermark into the first vertex data of the original three-dimensional model.

In an embodiment, the combination module 2302 is configured to perform operation 1 to operation 3 in operation 202.

In an embodiment, the generation module 2303 is configured to perform operation 203.

In an embodiment, the generation module 2303 is configured to perform operation 1 and operation 2 in operation 203.

In an embodiment, the combination module 2302 is configured to insert the second material data of the three-dimensional watermark into the first material data of the original three-dimensional model.

In an embodiment, the combination module 2302 is configured to randomly insert the second material data of the three-dimensional watermark into the first material data of the original three-dimensional model.

In an embodiment, the combination module 2302 is configured to perform operation 1 to operation 3 in operation 204.

In an embodiment, the generation module 2303 is configured to perform operation 205.

In an embodiment, the generation module 2303 is configured to perform operation 1 and operation 2 in operation 205.

The foregoing templates may be implemented based on hardware of a processor plus a memory, that is, the processor may run software code stored in the memory to execute corresponding software. The foregoing modules may be specifically software modules that execute corresponding functions in the software.

All the foregoing optional technical solutions may be randomly combined to form optional embodiments of this application, and details are not described herein.

It should be noted that the UE provided in the foregoing embodiments is described only using division of the foregoing functional modules. In practice, the functions may be allocated to different functional modules for implementation as required. To be specific, an internal structure of an apparatus is divided into different functional modules to implement all or part of the functions described above. In addition, the watermark embedding apparatus provided in the foregoing embodiment and the watermark embedding method embodiment belong to a same concept. For a specific implementation process, refer to the method embodiment. Details are not described herein again.

In an embodiment, this application further provides a computer program product that includes an instruction, and when the computer program product runs on a computer device, the computer device can implement an operation performed in the watermark embedding method in the foregoing embodiment.

In an embodiment, this application further provides a chip, where the chip includes a processor and/or a program instruction, and when the chip runs, an operation performed in the watermark embedding method in the foregoing embodiment is implemented.

All the foregoing optional technical solutions may be randomly combined to form optional embodiments of this application, and details are not described herein.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer program instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired or wireless manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD)), a semiconductor medium (for example, a solid-state drive), or the like.

The term "and/or" in this application describes only an association relationship for describing associated objects and represents that three relationships may exist. For example, A and/or B may represent the following three cases: Only A exists, both A and B exist, and only B exists. In addition, the character "/" in this application generally indicates an "or" relationship between the associated objects.

In this application, the term "a plurality of" means two or more. For example, a plurality of data packets refer to two or more data packets.

Terms such as "first" and "second" in this application are used to distinguish between same items or similar items with basically same functions or purposes. A person skilled in the art may understand that the words such as "first" and "second" do not limit a quantity and an implementation sequence.

A person of ordinary skill in the art may understand that all or some of the operations of the embodiments may be implemented by hardware or a program instructing related hardware. The program may be stored in a computer-readable storage medium. The storage medium may include: a read-only memory, a magnetic disk, or an optical disc.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. A watermark embedding method, comprising:
   obtaining an original three-dimensional (3D) model and a 3D watermark;
   combining first vertex data of the original 3D model and second vertex data of the 3D watermark to obtain target vertex data comprising the first vertex data and the second vertex data;
   combining first material data of the original 3D model and second material data of the 3D watermark to obtain target material data comprising the first material data and the second material data; and
   generating a target 3D model based on the target vertex data and the target material data, wherein the target 3D model comprises the original 3D model and the 3D watermark.

2. The method according to claim 1, wherein combining first vertex data of the original 3D model and second vertex data of the 3D watermark comprises:
   inserting the second vertex data of the 3D watermark into the first vertex data of the original 3D model.

3. The method according to claim 2, wherein inserting the second vertex data of the 3D watermark into the first vertex data of the original 3D model comprises:
   randomly inserting the second vertex data of the 3D watermark into the first vertex data of the original 3D model.

4. The method according to claim 3, wherein randomly inserting the second vertex data of the 3D watermark into the first vertex data of the original 3D model comprises:
   randomly selecting two adjacent locations from a first array of the original 3D model, wherein each location in the first array is used to store each piece of data in the first vertex data;
   reading any piece of data in the second vertex data from a second array of the 3D watermark, wherein each location in the second array is used to store each piece of data in the second vertex data; and
   inserting the read data between the two adjacent locations.

5. The method according to claim 1, wherein after combining first vertex data of the original 3D model and second vertex data of the 3D watermark, the method further comprises:
   generating first target index data based on the target vertex data, first index data corresponding to the first vertex data, and second index data corresponding to the second vertex data, wherein
   data pointed by any first target index in the first target index data is the same as data pointed by a corresponding first index in the first index data, or is the same as data pointed by a corresponding second index in the second index data.

6. The method according to claim 5, wherein generating first target index data based on the target vertex data comprises:
  combining the first index data and the second index data to obtain first candidate target index data comprising the first index data and the second index data; and
  updating the first candidate target index data based on the target vertex data to obtain the first target index data.

7. The method according to claim 6, wherein updating the first candidate target index data based on the target vertex data comprises:
  for any first index in the first index data, obtaining, based on data pointed by the first index, a first location of the data in the target vertex data; and updating, a first candidate index corresponding to the first index in the first candidate target index data to an index that identifies the first location; or
  for any second index in the second index data, obtaining, based on data pointed by the second index, a second location of the data in the target vertex data; and updating, a first candidate index corresponding to the second index in the first candidate target index data to an index that identifies the second location.

8. The method according to claim 1, wherein combining first material data of the original 3D model and second material data of the 3D watermark comprises:
  inserting the second material data of the 3D watermark into the first material data of the original 3D model.

9. The method according to claim 8, wherein inserting the second material data of the 3D watermark into the first material data of the original 3D model comprises:
  randomly inserting the second material data of the 3D watermark into the first material data of the original 3D model.

10. The method according to claim 9, wherein randomly inserting the second material data of the 3D watermark into the first material data of the original 3D model comprises:
  randomly selecting two adjacent locations from a third array of the original 3D model, wherein each location in the third array is used to store each piece of data in the first material data;
  reading any piece of data in the second material data from a fourth array of the 3D watermark, wherein each location in the fourth array is used to store each piece of data in the second material data; and
  inserting the read data between the two adjacent locations.

11. The method according to claim 1, wherein combining first material data of the original 3D model and second material data of the 3D watermark comprises:
  splicing a first map of the original 3D model and a second map of the 3D watermark to obtain a target map;
  updating first texture data of the original 3D model and second texture data of the 3D watermark based on the target map; and
  combining the updated first texture data and the updated second texture data to obtain target texture data comprising the updated first texture data and the updated second texture data.

12. The method according to claim 1, wherein after combining first material data of the original 3D model and second material data of the 3D watermark, the method further comprises:
  generating second target index data corresponding to the target material data based on the target material data, third index data corresponding to the first material data, and fourth index data corresponding to the second material data, wherein data pointed by any second target index in the second target index data is the same as data pointed by a corresponding third index in the third index data, or is the same as data pointed by a corresponding fourth index in the fourth index data.

13. The method according to claim 12, wherein generating second target index data corresponding to the target material data based on the target material data, third index data corresponding to the first material data, and fourth index data corresponding to the second material data comprises:
  combining the third index data and the fourth index data to obtain second candidate target index data comprising the third index data and the fourth index data; and
  updating the second candidate target index data based on the target material data to obtain the second target index data.

14. The method according to claim 13, wherein updating the second candidate target index data based on the target material data to obtain the second target index data comprises:
  for any third index in the third index data, obtaining, based on data pointed by the third index, a third location of the data in the target material data; and updating, a second candidate index corresponding to the third index in the second candidate target index data to an index that identifies the third location; or
  for any fourth index in the fourth index data, obtaining, based on data pointed by the fourth index, a fourth location of the data in the target material data; and updating, a second candidate index corresponding to the fourth index in the second candidate target index data to an index that identifies the fourth location.

15. A watermark embedding apparatus, comprising:
  an obtaining module to obtain an original 3D model and a 3D watermark;
  a combination module to
    combine first vertex data of the original 3D model and second vertex data of the 3D watermark to obtain target vertex data, wherein the target vertex data comprises the first vertex data and the second vertex data, and
    combine first material data of the original 3D model and second material data of the 3D watermark to obtain target material data comprising the first material data and the second material data; and
  a generation module to generate a target 3D model based on the target vertex data and the target material data, wherein the target 3D model comprises the original 3D model and the 3D watermark.

16. The apparatus according to claim 15, wherein the combination module is configured to insert the second vertex data of the 3D watermark into the first vertex data of the original 3D model.

17. The apparatus according to claim 16, wherein the combination module is configured to randomly insert the second vertex data of the 3D watermark into the first vertex data of the original 3D model.

18. The apparatus according to claim 17, wherein the combination module is configured to:
  randomly select two adjacent locations from a first array of the original 3D model, wherein each location in the first array is used to store each piece of data in the first vertex data;
  read any piece of data in the second vertex data from a second array of the 3D watermark, wherein each location in the second array is used to store each piece of data in the second vertex data; and insert the read data between the two adjacent locations.

19. The apparatus according to claim 15, wherein the generation module is configured to generate first target index data based on the target vertex data, first index data corresponding to the first vertex data, and second index data corresponding to the second vertex data, wherein data pointed by any first target index in the first target index data is the same as data pointed by a corresponding first index in the first index data, or is the same as data pointed by a corresponding second index in the second index data.

20. The apparatus according to claim 19, wherein the generation module is configured to:

combine the first index data and the second index data to obtain first candidate target index data comprising the first index data and the second index data; and update the first candidate target index data based on the target vertex data to obtain the first target index data.

21. The apparatus according to claim 20, wherein the generation module is configured to:

for any first index in the first index data, obtain, based on data pointed by the first index, a first location of the data in the target vertex data, and update, a first candidate index corresponding to the first index in the first candidate target index data to an index that identifies the first location; or for any second index in the second index data, obtain, based on data pointed by the second index, a second location of the data in the target vertex data, and update, a first candidate index corresponding to the second index in the first candidate target index data to an index that identifies the second location.

22. The apparatus according to claim 15, wherein the combination module is configured to insert the second material data of the 3D watermark into the first material data of the original 3D model.

23. The apparatus according to claim 22, wherein the combination module is configured to randomly insert the second material data of the 3D watermark into the first material data of the original 3D model.

24. The apparatus according to claim 23, wherein the combination module is configured to:

randomly select two adjacent locations from a third array of the original 3D model, wherein each location in the third array is used to store each piece of data in the first material data;

read any piece of data in the second material data from a fourth array of the 3D watermark, wherein each location in the fourth array is used to store each piece of data in the second material data; and insert the read data between the two adjacent locations.

25. The apparatus according to claim 15, wherein the combination module is configured to:

splice a first map of the original 3D model and a second map of the 3D watermark to obtain a target map;

update first texture data of the original 3D model and second texture data of the 3D watermark based on the target map; and combine the updated first texture data and the updated second texture data to obtain target texture data comprising the updated first texture data and the updated second texture data.

26. The apparatus according to claim 15, wherein the generation module is configured to generate second target index data corresponding to the target material data based on the target material data, third index data corresponding to the first material data, and fourth index data corresponding to the second material data, wherein data pointed by any second target index in the second target index data is the same as data pointed by a corresponding third index in the third index data, or is the same as data pointed by a corresponding fourth index in the fourth index data.

27. The apparatus according to claim 26, wherein the generation module is configured to:

combine the third index data and the fourth index data to obtain second candidate target index data comprising the third index data and the fourth index data; and update the second candidate target index data based on the target material data to obtain the second target index data.

28. The apparatus according to claim 27, wherein the generation module is configured to:

for any third index in the third index data, obtain, based on data pointed by the third index, a third location of the data in the target material data, and update, a second candidate index corresponding to the third index in the second candidate target index data to an index that identifies the third location; or for any fourth index in the fourth index data, obtain, based on data pointed to by the fourth index, a fourth location of the data in the target material data, and update, a second candidate index corresponding to the fourth index in the second candidate target index data to an index that identifies the fourth location.

29. A terminal, comprising a processor and a memory storing at least one instruction, which when executed by the processor, causes the processor to perform the watermark embedding method according to claim 1.

30. A non-transitory computer-readable storage medium having at least one instruction stored therein, which when executed by a processor, cause the processor to perform operations of embedding watermark, the operations comprising:

obtaining an original three-dimensional (3D) model and a 3D watermark;

combining first vertex data of the original 3D model and second vertex data of the 3D watermark to obtain target vertex data comprising the first vertex data and the second vertex data;

combining first material data of the original 3D model and second material data of the 3D watermark to obtain target material data comprising the first material data and the second material data; and generating a target 3D model based on the target vertex data and the target material data, wherein the target 3D model comprises the original 3D model and the 3D watermark.

* * * * *